US010903743B2

(12) United States Patent
Lynch et al.

(10) Patent No.: US 10,903,743 B2
(45) Date of Patent: Jan. 26, 2021

(54) METHODS AND APPARATUS TO ADJUST A TRANSIENT RESPONSE

(71) Applicant: Texas Instruments Incorporated, Dallas, TX (US)

(72) Inventors: Brian Thomas Lynch, Brookline, NH (US); Stefan Wlodzimierz Wiktor, Raleigh, NC (US); Joseph Maurice Khayat, Bedford, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 97 days.

(21) Appl. No.: 16/399,576

(22) Filed: Apr. 30, 2019

(65) Prior Publication Data

US 2020/0227913 A1    Jul. 16, 2020

Related U.S. Application Data

(60) Provisional application No. 62/791,929, filed on Jan. 14, 2019.

(51) Int. Cl.
| | | |
|---|---|---|
| *H02M 3/156* | (2006.01) | |
| *H02M 1/08* | (2006.01) | |
| *H02H 9/04* | (2006.01) | |
| *H02M 3/157* | (2006.01) | |
| *H02M 1/00* | (2006.01) | |

(52) U.S. Cl.
CPC ............ *H02M 3/156* (2013.01); *H02H 9/045* (2013.01); *H02M 1/08* (2013.01); *H02M 3/157* (2013.01); *H02M 2001/0003* (2013.01); *H02M 2001/0025* (2013.01); *H02M 2003/1566* (2013.01)

(58) Field of Classification Search
CPC .................... H02H 9/045; H02M 1/08; H02M 3/155–1588; H02M 2001/0025; H02M 2003/1566
See application file for complete search history.

(56) References Cited

U.S. PATENT DOCUMENTS

| | | | |
|---|---|---|---|
| 6,724,174 B1 * | 4/2004 | Esteves | H02M 3/155 323/224 |
| 7,342,528 B2 | 3/2008 | Ng et al. | |
| 7,808,218 B2 | 10/2010 | Xu et al. | |

(Continued)

OTHER PUBLICATIONS

PCT Search Report for Application No. PCT/US 2020/013378, dated Apr. 30, 2020.

*Primary Examiner* — Yusef A Ahmed
(74) *Attorney, Agent, or Firm* — Mark Allen Valetti; Charles A. Brill; Frank D. Cimino

(57) ABSTRACT

Methods, apparatus, systems and articles of manufacture are disclosed to adjust a transient response. An example apparatus includes a clamping circuit including a first input, a second input, a third input, and an output, wherein the first input is adapted to be coupled to a selector, a reference voltage generator including an output, wherein the output of the reference voltage generator is coupled to the second input of the clamping circuit, an error amplifying circuit including an output, wherein the output of the error amplifying circuit is coupled to the third input of the clamping circuit, and a pulse width modulator including an input, wherein the input of the pulse width modulator is coupled to the output of the clamping circuit.

20 Claims, 10 Drawing Sheets

(56) References Cited

U.S. PATENT DOCUMENTS

| | | | |
|---|---|---|---|
| 8,193,794 B2* | 6/2012 | Peng | H02M 3/1588 |
| | | | 323/282 |
| 9,287,776 B2* | 3/2016 | Mei | H02M 3/156 |
| 9,306,548 B1 | 4/2016 | Wiktor et al. | |
| 9,991,777 B2 | 6/2018 | Lynch et al. | |
| 10,075,073 B2 | 9/2018 | Guan et al. | |
| 10,775,817 B2* | 9/2020 | Sisson | G05F 1/468 |
| 2004/0090558 A1* | 5/2004 | Takahashi | H04N 5/185 |
| | | | 348/691 |
| 2008/0218134 A1* | 9/2008 | Kawakami | H02M 3/156 |
| | | | 323/238 |
| 2008/0284398 A1* | 11/2008 | Qiu | H02M 3/156 |
| | | | 323/283 |
| 2009/0039853 A1* | 2/2009 | Omi | H02M 3/156 |
| | | | 323/284 |
| 2009/0128112 A1* | 5/2009 | Xu | H02M 1/32 |
| | | | 323/282 |
| 2010/0019748 A1* | 1/2010 | Kleine | H02M 3/158 |
| | | | 323/282 |
| 2010/0052628 A1* | 3/2010 | Khayat | H02M 3/157 |
| | | | 323/234 |
| 2010/0061442 A1 | 3/2010 | O'Malley et al. | |
| 2010/0164462 A1* | 7/2010 | Yen | H02M 3/156 |
| | | | 323/288 |
| 2010/0253309 A1* | 10/2010 | Xi | H02M 3/156 |
| | | | 323/288 |
| 2011/0074373 A1* | 3/2011 | Lin | H02M 3/156 |
| | | | 323/282 |
| 2011/0279045 A1* | 11/2011 | Uchimoto | H05B 45/37 |
| | | | 315/186 |
| 2015/0222180 A1* | 8/2015 | Deguchi | H02M 3/156 |
| | | | 323/282 |
| 2015/0229210 A1* | 8/2015 | Takada | H02M 3/158 |
| | | | 323/284 |
| 2017/0070149 A1* | 3/2017 | Guan | H02M 1/32 |
| 2018/0183338 A1* | 6/2018 | Fukushima | H02M 3/156 |
| 2019/0068055 A1* | 2/2019 | Takada | H02M 1/36 |
| 2019/0115835 A1* | 4/2019 | Cohen | H02M 3/1588 |
| 2020/0076382 A1* | 3/2020 | Mei | H02M 3/156 |
| 2020/0161973 A1* | 5/2020 | Fukushima | H03F 3/2173 |

* cited by examiner

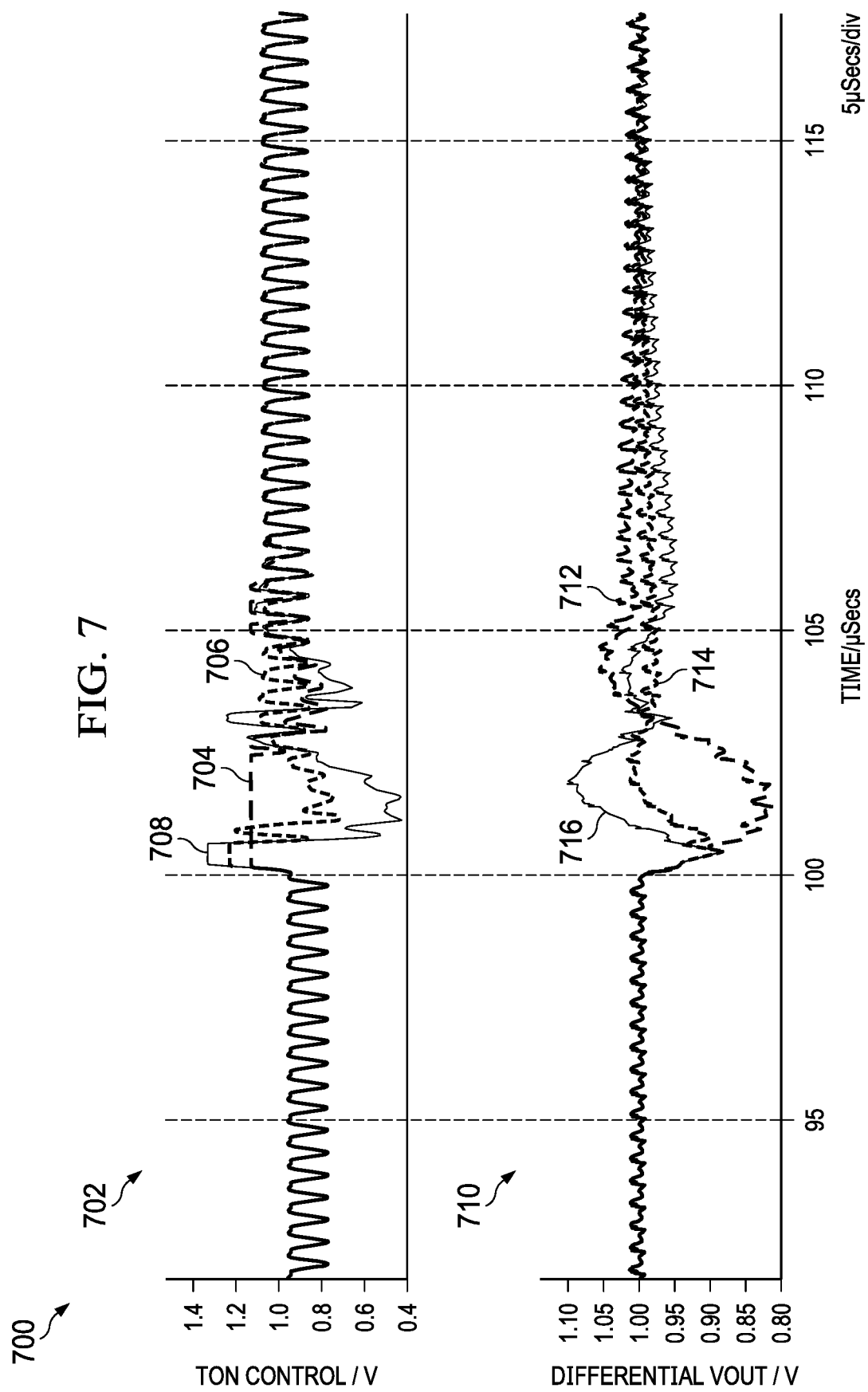

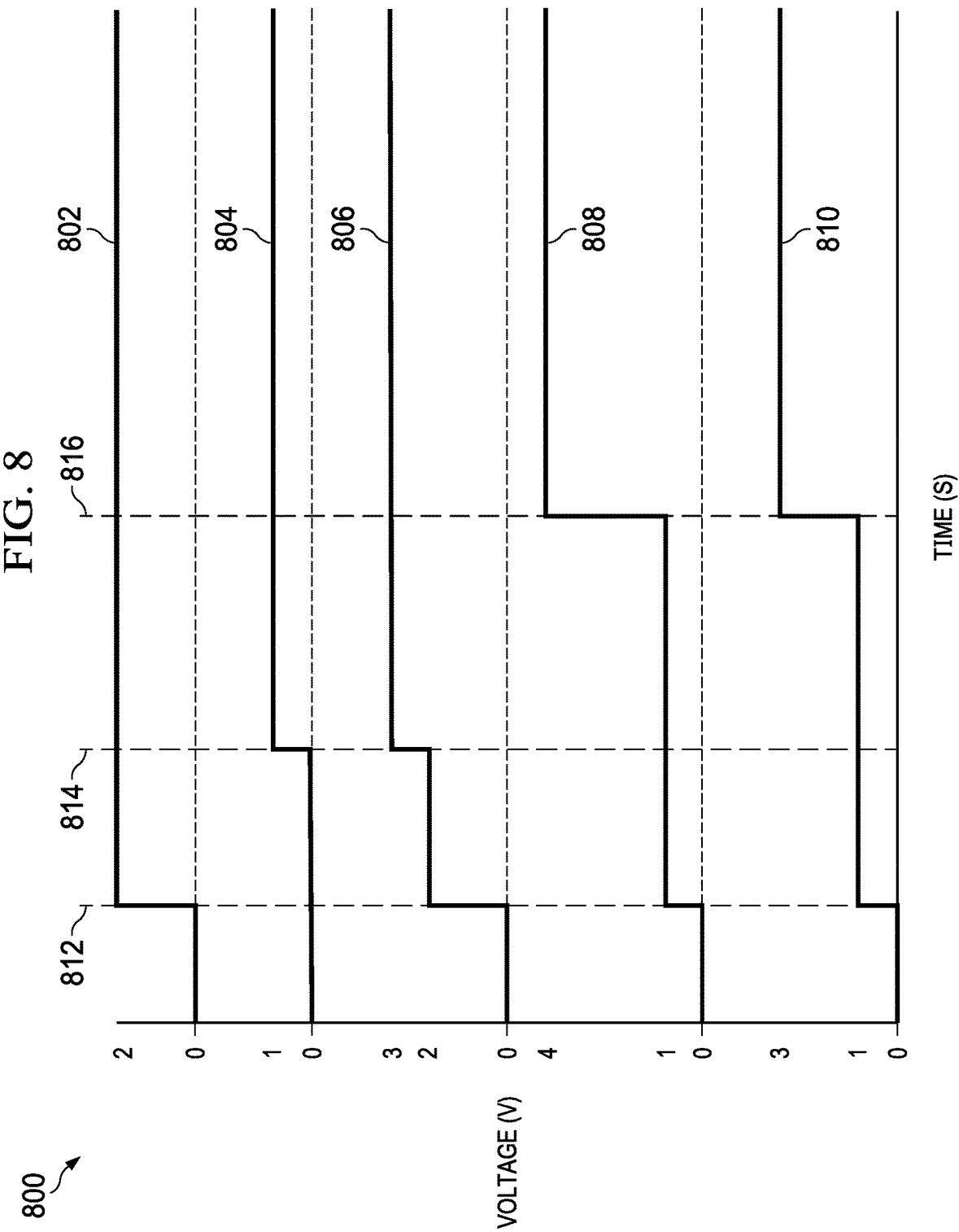

METHODS AND APPARATUS TO ADJUST A TRANSIENT RESPONSE

RELATED APPLICATION

This patent arises from an application claiming the benefit of U.S. Provisional Patent Application Ser. No. 62/791,929, which was filed on Jan. 14, 2019. U.S. Provisional Patent Application Ser. No. 62/791,929 is hereby incorporated herein by reference in its entirety. Priority to U.S. Provisional Patent Application Ser. No. 62/791,929 is hereby claimed.

FIELD OF THE DISCLOSURE

This disclosure relates generally to power converters, and, more particularly, to methods and apparatus to adjust a transient response.

BACKGROUND

Power converters (e.g., buck converters, buck-boost converters, etc.) and/or various power electronic devices operate in response to a pulse width modulated (PWM) signal generated by a PWM signal generator. In some power converters and/or various power electronic device applications, switches (e.g., transistors) are controlled by ramp-based pulse width modulation techniques (e.g., analog controlled). Delay-based pulse width modulation techniques are an alternative to ramp-based pulse width modulation techniques. Delay-based pulse width modulation techniques utilize a delay-based PWM (DPWM) signal generator to generate a signal in which pulse width of the DPWM signal is a function of a delay.

BRIEF DESCRIPTION OF THE DRAWINGS

FIG. 7 is a signal plot depicting a clamped control signal and a converter output voltage signal of the circuit of FIG. 3.

FIG. 8 is a signal plot depicting various signals of FIGS. 3, 4, 5, 6A, 6B, and 6C.

The figures are not to scale. In general, the same reference numbers will be used throughout the drawing(s) and accompanying written description to refer to the same or like parts.

Figure 1:
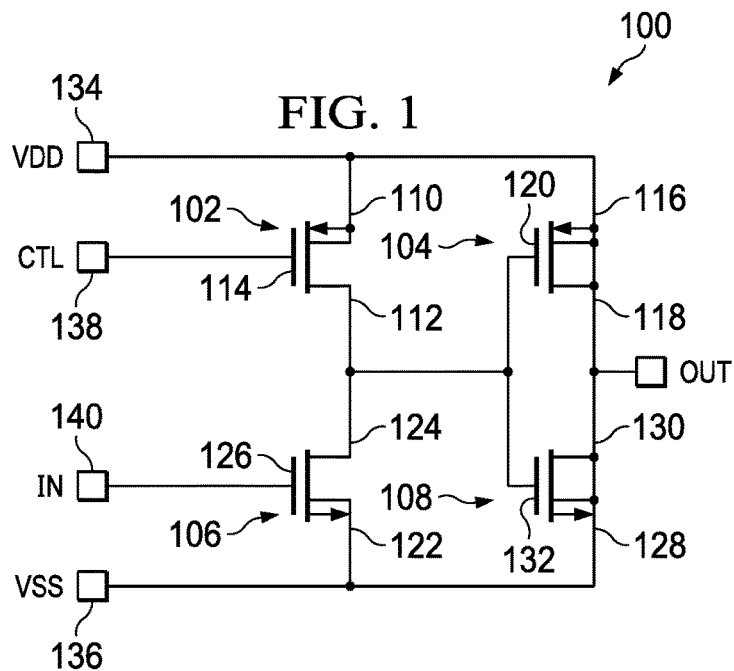
FIG. 1 is a schematic illustration of an example delay cell.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components. Additionally, in this description, the term "couple" or "couples" means either an indirect or direct connection.

DETAILED DESCRIPTION

Direct current to direct current (DC-DC) converters and/or suitable power electronic devices (e.g., inverters) utilize a number of switches (e.g., transistors) responsive to a controller-generated PWM signal. In such applications, the controller includes a PWM signal generator to generate and/or otherwise supply the PWM signal in response to monitoring the output voltage of the coupled DC-DC converter. In some applications, the PWM signal generator is a DPWM signal generator (e.g., a pulse width modulated signal generator that generates a pulse width modulated signal based on a delay time and/or period) rather than a traditional analog-based PWM signal generator. A DPWM signal generator is advantageous as compared to an analog-based PWM signal generator because a DPWM signal generator is capable of producing narrower PWM pulses (e.g., a pulse less than 30 nanoseconds) without jitter, whereas an analog-based PWM signal generator is typically not capable of producing such narrow pulses.

Rather than producing a PWM signal by comparing a control signal voltage with a ramp-based signal (e.g., a saw tooth signal), as done by analog-based PWM generators, a DPWM signal generator creates and/or otherwise generates a PWM signal by introducing a delay corresponding to a desired pulse width. To introduce the desired delay, a DPWM signal generator includes a plurality of delay cells controllable by at least one control signal. The control signal is generated by a controller and indicates the length of delay each of the plurality of delay cells is to introduce (e.g., 1.0 nanoseconds, 1.2 nanoseconds, etc.).

The controller monitors an output voltage of a DC-DC converter and varies the voltage of the control signal to stabilize the output voltage of the DC-DC converter. For example, during load transients in the DC-DC converter, the control signal voltage to the delay cells is altered accordingly to normalize the output voltage of the DC-DC converter (e.g., the length of delay introduced by the delay cells is adjusted).

FIG. 1 is a schematic illustration of an example delay cell 100. The delay cell 100 includes an example first transistor 102, an example second transistor 104, an example third transistor 106, and an example fourth transistor 108. Illustrated in FIG. 1, the first transistor 102 and the second transistor 104 are p-channel metal-oxide-semiconductor field-effect transistors (PMOSFET or PMOS). Additionally, the third transistor 106 and the fourth transistor 108 are n-channel metal-oxide-semiconductor field-effect transistors (NMOSFET or NMOS). Alternatively, any of the first transistor 102, the second transistor 104, the third transistor 106, and/or the fourth transistor 108 may be any suitable switching device (e.g., NMOS, PMOS, bi-polar junction gate transistor (BJT), etc.).

In the example illustrated in FIG. 1, the first transistor 102 includes an example first source terminal 110, and an example first drain terminal 112, and an example first gate terminal 114. The second transistor 104 includes an example second source terminal 116, and an example second drain terminal 118, and an example second gate terminal 120. The third transistor 106 includes an example third source terminal 122, and an example third drain terminal 124, and an example third gate terminal 126. The fourth transistor 108 includes an example fourth source terminal 128, and an example fourth drain terminal 130, and an example fourth gate terminal 132. The first source terminal 110 of the first transistor 102 and the second source terminal 116 of the second transistor 104 are coupled to an example power rail 134. In FIG. 1, the power rail 134 is VDD. Similarly, the third source terminal 122 and the fourth source terminal 128 are coupled to an example reference rail 136. The first gate terminal 114 of the first transistor 102 is coupled to an example control signal node 138. Additionally, the third gate terminal 126 of the third transistor 106 is coupled to an example input signal node 140.

Due to the inherent nature of the first transistor 102, the turn-on time ($T_{ON}$) of the delay cell 100 is non-linear with respect to the control signal voltage. The delay cell 100 turn-on time ($T_{ON}$) is illustrated below in equation 1.

$$T_{ON} = \frac{C * \frac{V_{dd}}{2}}{\beta * V^2} * \eta \quad \text{Equation 1}$$

In Equation 1, the variable C is the equivalent capacitance at the common node shared by the first drain terminal 112, the second gate terminal 120, and the fourth gate terminal 132, the variable $V_{dd}$ is the magnitude of the voltage at the first source terminal 110, the variable $\beta$ is the mobility multiplied by a proportion of the width and the length of the first transistor 102, the variable V is the magnitude of the voltage of the control signal at the control signal node 138, and the variable $\eta$ is the permittivity of the first transistor 102.

In the example illustrated in FIG. 1, the turn-on time ($T_{ON}$) of the delay cell 100 is a function of the squared voltage of the control signal at the control signal node 138 (e.g., $V^2$). Therefore, when the magnitude of the control signal voltage is affected (e.g., during load transients to maintain a desired output voltage level), the turn-on time ($T_{ON}$) of the delay cell 100 varies non-linearly (e.g., a function of the squared control signal voltage). In such an example, the gain in the system (e.g., the DPWM signal generator and DC-DC converter) is proportional to the relative change in duty cycle of the control signal, relative to change in voltage of the control signal. Therefore, a non-linear change in turn-on time ($T_{ON}$) of the delay cell 100 causes a non-linear change in duty cycle and, an introduction of a non-linear gain in the delay cell 100. Additionally, the non-linearity cascades through the system (e.g., the DPWM signal generator and DC-DC converter).

Figure 2:
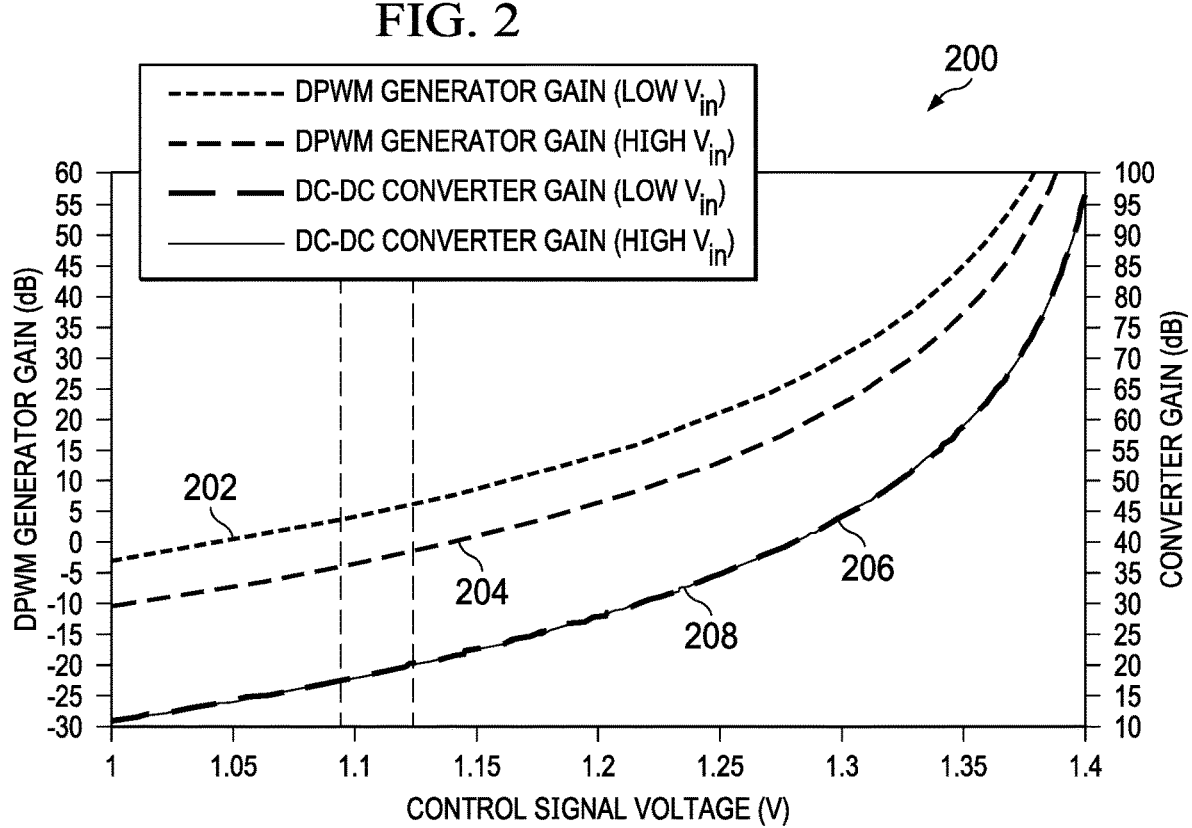
FIG. 2 is a graphical illustration of DPWM gain and converter gain versus control signal voltage.

FIG. 2 is a graphical illustration 200 of DPWM gain and converter gain versus control signal voltage. With respect to the delay cell 100 of FIG. 1, as the magnitude of the control signal voltage increases (e.g., from 1 volt to 1.4 volts), the gain of the DPWM signal generator housing the delay cell 100 increases non-linearly. The low input voltage and high input voltage simulations illustrating the DPWM gain are illustrated as lines 202 and 204, respectively. Likewise, as the magnitude of the control signal voltage increases (e.g., from 1 volt to 1.4 volts), the gain of the DC-DC converter increases non-linearly. The low input voltage and high input voltage simulations illustrating the DC-DC converter gain are illustrated as lines 206 and 208, respectively.

Examples disclosed herein provide methods and apparatus to limit the non-linear increase of a gain characteristic in any one of a delay cell, a DPWM signal generator, and/or a DC-DC converter. Examples disclosed herein clamp (e.g., limit) the DWPM gain and/or the DC-DC converter gain using a desired threshold voltage to adjust the transient response of the DC-DC converter. In examples disclosed herein, a non-linear increase in turn-on time of an example delay cell is limited by clamping the control signal voltage to the desired threshold voltage. In such example, the desired threshold voltage is a summed voltage equivalent to, or proportional to, the sum of a first reference voltage signal and a second reference voltage signal. As used herein, a first value (e.g., a first voltage value, a first current value, etc.,) is substantially similar to a second value (e.g., a second voltage value, a second current value, etc.,) if the first value is within a desired tolerance (e.g., 5%) of the second value. Additionally, the second reference voltage signal is configurable (e.g., the voltage level of the second reference voltage signal can be increased or decreased external to the circuit).

In such examples disclosed herein, a clamping circuit is coupled to the DPWM signal generator and configured to receive the control signal. The clamping circuit ensures the magnitude of the control signal is limited to a threshold value. In examples disclosed herein, the magnitude of the control signal is limited (e.g., clamped to the threshold value) to regulate the non-linear turn-on time and/or gain of the controller. In operation, the clamping circuit may have a similar effect as decoupling the small signal gain (e.g., small signal loop response of the controller) from the large signal transient gain (e.g., large signal transient response) of the controller. For example, an increase and/or decrease in the large signal transient gain of the controller resulting from a transient output voltage may be independent from affecting the small signal gain of the controller (e.g., small signal loop response of the controller) so as to be independent from the magnitude of a resulting PWM signal.

Examples disclosed herein include, at least, an adjuster and a summing network (e.g., a summing buffer, a resistive summation network, common node voltage summation). In examples disclosed herein, the summing network is utilized to generate a threshold signal for use in comparison with the control signal. The threshold signal is a signal representative of the sum of the first reference voltage signal and the second reference voltage signal. In such examples, if the control signal voltage does not exceed the threshold signal, the control signal remains the output of the clamping circuit for use by a DPWM signal generator. Alternatively, if the control signal voltage exceeds the threshold signal, the threshold signal becomes a clamped signal at the output of the clamping circuit (e.g., the clamped control signal) for use by a DPWM signal generator.

Figure 3:
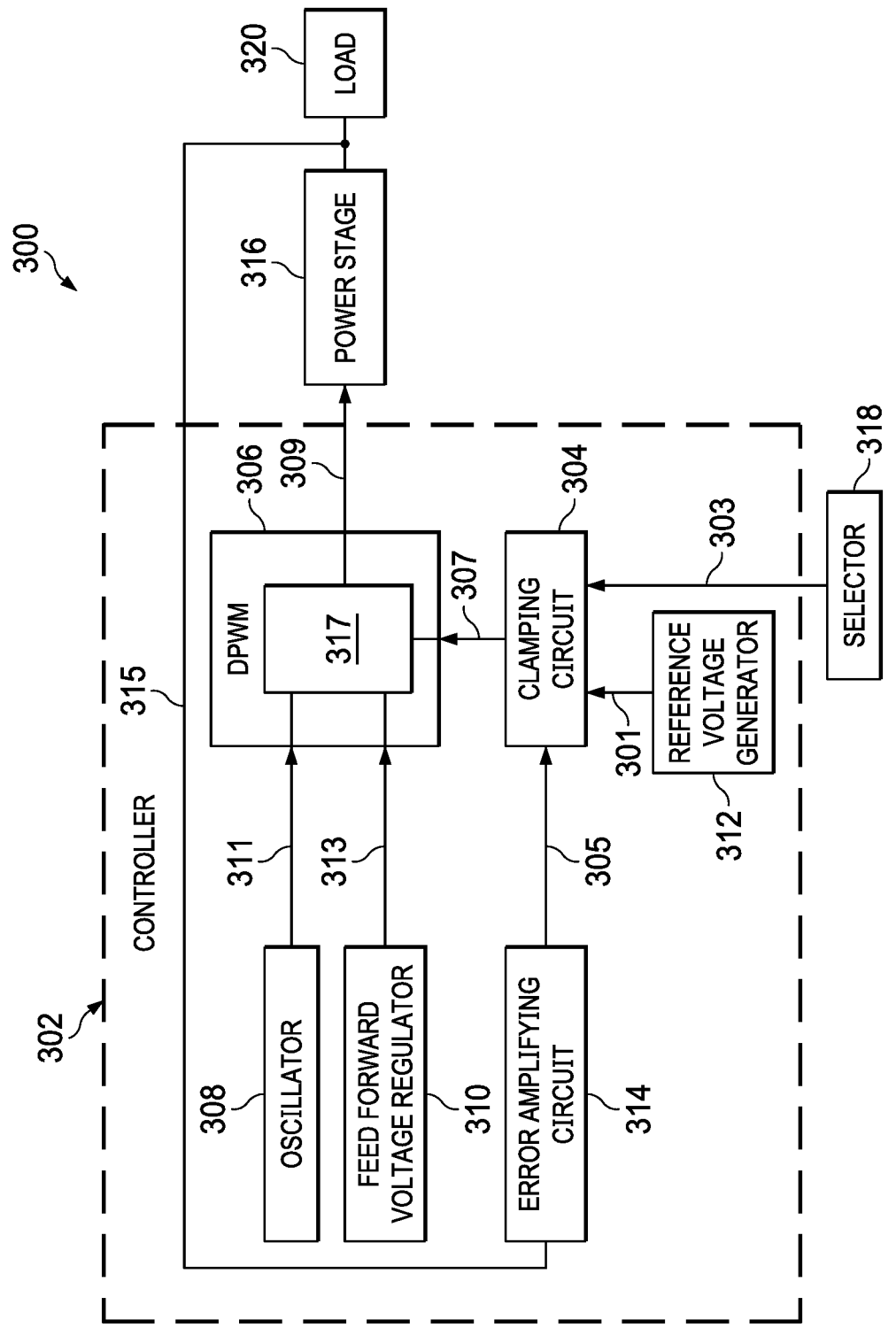
FIG. 3 is a schematic illustration of an example environment including an example controller and an example clamping circuit to control a gain limit of an example DPWM signal generator.

FIG. 3 is a schematic illustration of an example power converter system 300 including an example controller 302 and an example clamping circuit 304 to control a gain limit of an example modulator 306. In FIG. 3, the controller 302 includes the clamping circuit 304, the modulator 306, an example oscillator 308, an example feed forward voltage regulator 310, an example reference voltage generator 312, and an example error amplifying circuit 314. Illustrated in FIG. 3, the controller 302 is coupled to an example power stage 316 and an example selector 318. In other examples disclosed herein, the power stage 316 and/or the selector 318 may be included in the controller 302 implemented in an integrated circuit.

In the example illustrated in FIG. 3, the controller 302 is an integrated circuit (IC) capable of driving the coupled power stage 316. For example, the controller 302 may be used to drive the power stage 316 in any suitable type of electrical device such as an electric device included in an electric vehicle (EV) (e.g., a traction inverter), a hybrid-electric vehicle (HEV), DC telecom systems, data communication and/or transmission systems, telephone communication and/or transmission systems, etc. Alternatively, the controller 302 may be implemented using hardware logic, machine readable instructions, hardware implemented state machines, etc., and/or a combination thereof.

In the example illustrated in FIG. 3, the clamping circuit 304 is coupled to the modulator 306, the reference voltage generator 312, the error amplifying circuit 314, and the selector 318. The clamping circuit 304 receives a first reference voltage signal (line 301) from the reference voltage generator 312 and a second reference voltage signal (line 303) from the selector 318. Additionally, the clamping circuit 304 receives an example control signal (line 305) from the error amplifying circuit 314. In operation, the clamping circuit 304 clamps (e.g., limits) the control signal (line 305) if the control signal (line 305) reaches a magnitude greater than the sum of the first reference voltage signal (line 301) and the second reference voltage signal (line 303). In some examples disclosed herein, the sum of the first reference voltage signal (line 301) and the second reference voltage signal (line 303) may hereinafter be referred to as a threshold value, and such threshold value may be any threshold voltage and/or current value (e.g., 0.9 volts, 1.5 volts, etc.). For example, if the first reference voltage signal (line 301) is 1 volt and the second reference voltage signal (line 303) is 200 millivolts (mV), then the control signal (line 305) is clamped to 1.2 volts. The resulting clamped signal is referred to as the clamped control signal (line 307). In examples in which the control signal (line 305) is less than the threshold value (e.g., the sum of the first reference voltage signal (line 301) and the second reference voltage signal (line 303)), then the clamped control signal (line 307) is unchanged and, as such, equivalent to the control signal (line 305). In operation, the clamping circuit 304 clamps the control signal (line 305) in a high-speed limiting circuit (e.g., a clamping circuit to clamp the control signal (line 305) in less than 1 millisecond, 1.5 milliseconds, etc.) to limit the change in control loop gain (e.g., gain of the controller 302) that may occur during a load transient (e.g., a change in output voltage (line 315). The operation of the clamping circuit 304 will be explained in further detail below. In examples disclosed herein, the threshold voltage may be any summed voltage and/or summed current equivalent to, or proportional to, the sum of the sum of the first reference voltage signal (line 301) and the second reference voltage signal (line 303).

In FIG. 3, the modulator 306 is coupled to the clamping circuit 304, the oscillator 308, the feed forward voltage regulator 310, and the power stage 316. In the example of FIG. 3, the modulator 306 is a DPWM signal generator. In the example illustrated in FIG. 3, the modulator 306 includes a plurality of example delay cells 317 to generate a PWM signal (line 309). In examples disclosed herein, the modulator 306 generates the PWM signal (line 309) by introducing a delay to an example oscillating signal (line 311) in response to the clamped control signal (line 307). The modulator 306 may be used to provide the PWM signal (line 309) to the power stage 316 to provide power via any suitable gate driver circuit to an example load 320. For example, the modulator 306 may provide the PWM signal (line 309) to a series of buffers in order to amplify and/or source additional current to properly drive the power stage 316. In other examples disclosed herein, the modulator 306 may be implemented using any suitable signal modulator (e.g., an analog-based PWM generator, etc.) to provide a PWM signal for the power stage 316.

In the example illustrated in FIG. 3, the oscillator 308 produces the oscillating signal (line 311). In FIG. 3, the oscillating signal (line 311) may be a periodic and/or aperiodic signal generated to initiate the generation of the PWM signal (line 309) and/or otherwise set the frequency in which the plurality of delay cells 317 operates. For example, when the oscillator 308 outputs the oscillating signal (line 311), the delay cells 317 generate a corresponding rising edge on the PWM signal (line 309) when the oscillating signal (line 311) is at a falling edge. In such an example, the PWM signal (line 309) is maintained at a logic high value for the duration of delay associated with number of the plurality of delay cells 317 active. The number of the plurality of delay cells 317 active is indicated by an example feed forward voltage signal (line 313).

In the example illustrated in FIG. 3, the feed forward voltage regulator 310 produces the feed forward voltage signal (line 313) for use by the plurality of delay cells 317. For example, the feed forward voltage regulator 310 may produce the feed forward voltage signal (line 313) as an eight-bit binary signal to indicate the number of the plurality of delay cells 317 to be active. In other examples disclosed herein, the feed forward voltage signal (line 313) may be any other suitable signal (e.g., a decoded digital signal, analog signal, optical signal, etc.) to indicate the number of the plurality of delay cells 317 to be active.

In the example illustrated in FIG. 3, the reference voltage generator 312 is coupled to the clamping circuit 304 to provide a voltage reference signal (e.g., the first reference voltage signal (line 301)). In FIG. 3, the reference voltage generator 312 is a voltage regulator that provides a trimmed fixed voltage signal (e.g., the first reference voltage signal (line 301)) to serve as a reference voltage for the control signal (line 305). In some examples disclosed herein, the first reference voltage signal (line 301) from the reference voltage generator 312 is trimmed and/or otherwise adjusted during manufacture of the controller 302. In examples disclosed herein, the first reference voltage signal (line 301) is temperature compensated (e.g., altered and/or otherwise changed by the reference voltage generator 312 in response to a change in external temperature and/or the temperature of a silicon die). For example, as the temperature of the plurality of delay cells 317 increases and/or decrease above and/or below normal operating conditions (e.g., 100 degrees Celsius), the reference voltage generator 312 may adjust the magnitude of the first reference voltage signal (line 301) accordingly to ensure proper operation throughout all temperatures (e.g., at, below, and/or above normal operating conditions).

In the example illustrated in FIG. 3, the error amplifying circuit 314, is coupled to the output of the power stage 316 and to the clamping circuit 304. The error amplifying circuit 314 produces the control signal (line 305) in response to monitoring the output voltage signal of the power stage 316

(line 315). For example, if the output voltage signal (line 315) of the power stage 316 deviates away from the desired level (e.g., if the output voltage increases and/or decreases above normal operating levels during transients), then the error amplifying circuit 314 adjusts the control signal (line 305) to account for such a change in the output voltage signal (line 315). In some examples disclosed herein, the error amplifying circuit 314 may include a plurality of error amplifiers such as a two-pole, 1-zero amplifier and/or a one-pole, one-zero amplifier to generate the control signal (line 305).

In the example illustrated in FIG. 3, the power stage 316 is a DC-DC converter triggered by the PWM signal (line 309). In examples disclosed herein, the power stage 316 is a DC-DC power converter such as a boost converter, buck-boost converter, etc. Alternatively, the power stage 316 may be any power stage (e.g., DC-DC converter, alternating current to direct current (AC-DC) converter, etc.,) in any suitable telecom application, datacom application, server, automotive application (e.g., traction inverter in an EV), industrial application (e.g., bridge inverter, motor drive, etc.), or any suitable power stage in an integrated circuit. In other examples, the power stage 316 may be two synchronous switches, additional power converter control logic, or a combination thereof In FIG. 3, the power stage 316 produces the output voltage signal (line 315). Additionally, the output voltage signal (line 315) is monitored by the controller 302 and, more specifically, the error amplifying circuit 314. The output voltage signal (line 315) is utilized to provide power to the load 320. In the example illustrated in FIG. 3, the load 320 may be an LED array in an EV, a motor, a server, industrial and/or residential appliances, a datacom server, or any suitable load. In other examples, the load 320 may be one or more inductors, capacitors, resistors, or a combination thereof to filter the output of the power stage 316.

In the example illustrated in FIG. 3, the selector 318 is coupled to the clamping circuit 304 to provide the second reference voltage signal (line 303). In FIG. 3, the selector 318 is a configurable apparatus to provide the second reference voltage signal (line 303). In examples disclosed herein, the selector 318 may be a microcontroller controllable to adjust the second reference voltage signal (line 303). In such an example, the selector 318 is external to the controller 302 and provides the second reference voltage signal (line 303). For example, the operation of the selector 318 may be altered by programming the selector 318 via a user input to provide a desired threshold voltage (e.g., the second reference voltage signal (line 303)). In some examples disclosed herein, the second reference voltage signal (line 303) may be generated using hardware components (e.g., plurality of selectable resistors, hardware registers), controllable in response to the second reference voltage signal (line 303), to generate and/or otherwise cause a corresponding voltage drop equivalent to, or proportional to, the magnitude of the second reference voltage signal (line 303). In other examples disclosed herein, the selector 318 may be implemented internal to the controller 302. In such examples disclosed herein, the controller 302 may have an external input pin in which the selector 318 can be programmed through.

Figure 4:
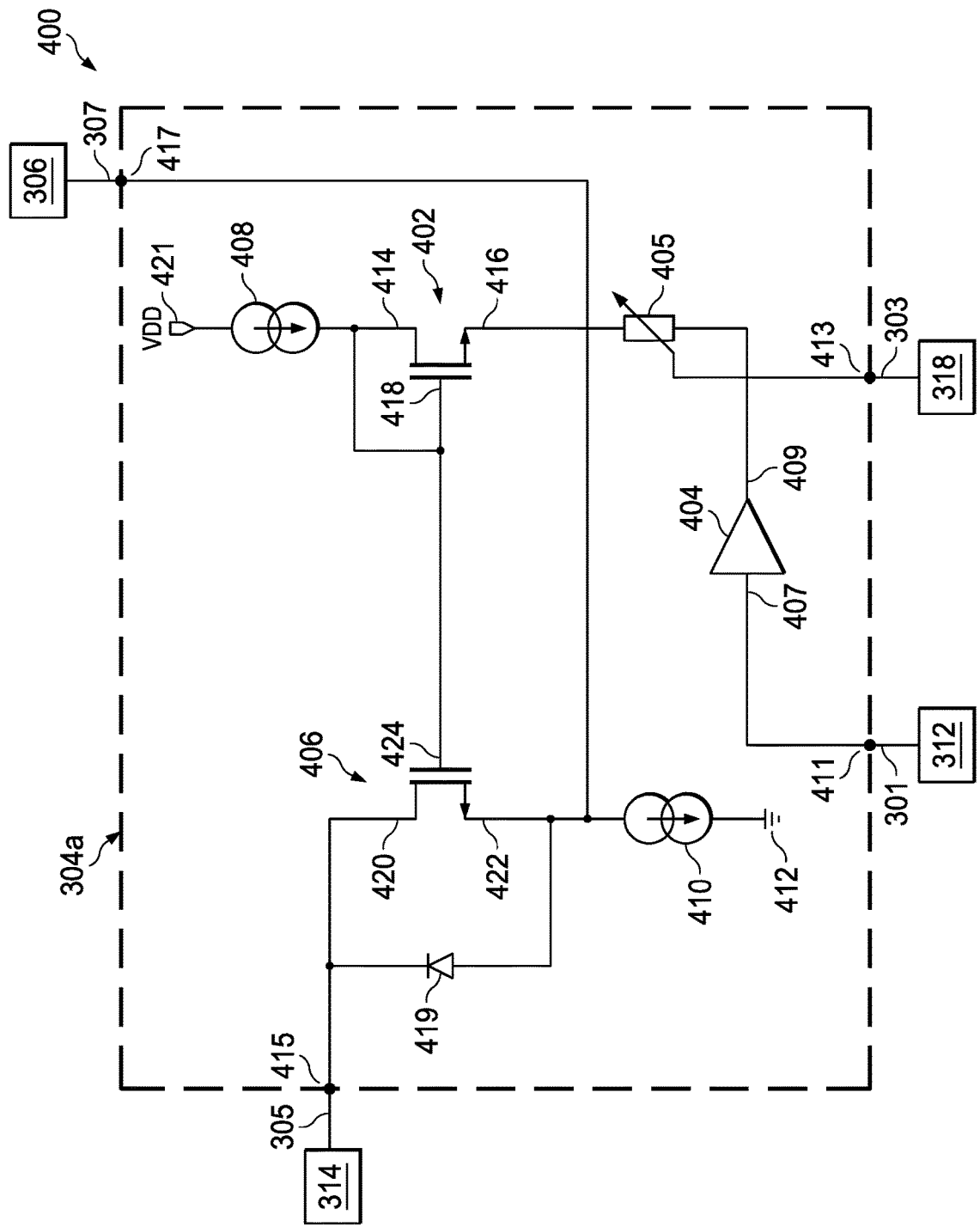
FIG. 4 is a schematic illustration of a first example implementation of the clamping circuit of FIG. 3 to control a gain limit of the DPWM signal generator of FIG. 3.

FIG. 4 is a schematic illustration 400 of a first example implementation 304a of the clamping circuit 304 of FIG. 3 to control a gain limit of the modulator 306 of FIG. 3. For example, the first implementation 304a is a first example clamping circuit 304a. In FIG. 4, the first example clamping circuit 304a includes an example first switch 402, an example buffer 404, an example variable resistor 405, and example second switch 406, an example first current source 408, an example second current source 410, and an example reference rail 412.

In FIG. 4, the first switch 402 includes an example first drain terminal 414, an example first source terminal 416, and an example first gate terminal 418. In the topology illustrated in FIG. 4, the first switch 402 is a NMOS device. In other examples disclosed herein, the first switch 402 may be any suitable switching device (e.g., PMOS, BJT, etc.). In FIG. 4, the first drain terminal 414 is coupled to the first current source 408 and further to an example power rail 421. The first source terminal 416 is coupled to the variable resistor 405. The first gate terminal 418 is coupled to the first drain terminal 414. In the topology illustrated in FIG. 4, the first switch 402 is a diode connected switch (e.g., the first drain terminal 414 is coupled to the first gate terminal 418). In such an arrangement (e.g., connected as a diode connected device), the first switch 402 operates in saturation (e.g., a change in current conducting through the first drain terminal 414 to the first source terminal 416 is independent from a change in the voltage drop from the first drain terminal 414 to the first source terminal 416).

In the example illustrated in FIG. 4, the buffer 404 includes an example input terminal 407 and example output terminal 409. In FIG. 4, the input terminal 407 of the buffer 404 is coupled to an example first input connector 411. Additionally, the output terminal 409 is coupled to the variable resistor 405. In FIG. 4, the buffer 404 is a non-inverting buffer that may produce a voltage at the output terminal 409 equivalent voltage at the input terminal 407. In the example illustrated in FIG. 4, the voltage at the input terminal 407 is the voltage of the first reference voltage signal (line 301) of FIG. 3 and thus, the voltage at the output terminal 409 is the voltage of the first reference voltage signal (line 301) of FIG. 3. In other examples disclosed herein, the buffer 404 may be implemented using any suitable network of devices such as a series of buffers, a tri-state digital buffer, an inverting buffer, etc.

In the example illustrated in FIG. 4, the variable resistor 405 is coupled to the output terminal 409 of the buffer 404 and to the first source terminal 416 of the first switch 402. In examples disclosed herein, the variable resistor 405 may be implemented as a three-terminal resistor with a sliding and/or rotating contact controllable by the second reference voltage signal (line 303) from an example second input connector 413. For example, the variable resistor 405 may be a potentiometer. The variable resistor 405 may be adjusted (e.g., the resistance may be altered in response to the second reference voltage signal (line 303)) in order to ensure the voltage at the first source terminal 416 is the effective summed voltage of the first reference voltage signal (line 301) and the second reference voltage signal (line 301). In examples disclosed herein, the voltage drop from the first drain terminal 414 to the first source terminal 416 may be negligible (e.g., a 0.1 voltage drop across the first drain terminal 414 to the first source terminal 416). Therefore, because the first switch 402 is configured to operate in saturation, the variable resistor 405 ensures the voltage drop from the power rail 421 to the first drain terminal 414, which is substantially similar to (e.g., within a 5% tolerance) the voltage drop from the power rail 421 to the first source terminal 416, is equivalent to the summed voltage of the first reference voltage signal (line 301) and the voltage drop from the output terminal 409 to the first source terminal 416. In examples disclosed herein, the voltage drop from the output terminal 409 to the first source terminal 416 may be equivalent to, or proportional to, the voltage of the second reference voltage signal (line 303). In examples disclosed herein, the second reference voltage signal (line 303) may be set in order to alter the resistance of the variable resistor 405 and thus, alter the voltage drop from the output terminal 409 to the first source terminal 416.

Because the first drain terminal 414 of the first switch 402 is coupled to the first gate terminal 418 of the first switch 402, the voltage at the first gate terminal 418 will be equivalent to the voltage at the first drain terminal 414. Therefore, the voltage at the first gate terminal 418 is equivalent to, or proportional to, the summed voltage of the first reference voltage signal (line 301) and the second reference voltage signal (line 303).

In FIG. 4, the second switch 406 includes an example second drain terminal 420 coupled to the error amplifying circuit 314 of FIG. 3 via an example third input connector 415, an example second source terminal 422 coupled to the modulator 306 of FIG. 3 via an example fourth input connector 417, and an example second gate terminal 424. In the topology illustrated in FIG. 4, the second switch 406 is a NMOS device. In other examples disclosed herein, the second switch 406 may be any suitable switching device (e.g., PMOS, BJT, etc.).

In FIG. 4, the second gate terminal 424 is coupled to the first gate terminal 418 of the first switch 402. In such an arrangement, the voltage at the first gate terminal 418 (e.g., the voltage at the first drain terminal 414) is equivalent to the voltage at the second gate terminal 424 of the second switch 406.

In operation, if the voltage drop from the second drain terminal 420 to the second source terminal 422 is less than the voltage drop from the second gate terminal 424 to the second source terminal 422, minus a switch threshold voltage (e.g., 0.7 volts), then the second switch 406 operates in the ohmic region of operation. When the second switch 406 operates in the ohmic region of operation, the voltage at second drain terminal 420 (e.g., the voltage of the control signal (line 305)) linearly drops across the second switch 406 to the second source terminal 422 due to the drain-to-source resistance ($R_{DS\_ON}$) of the second switch 406. For example, if the voltage of the control signal (line 305) is 1.2 volts (e.g., the voltage drop from the second drain terminal 420 to the second source terminal 422 is 1.2 volts), and the voltage of second gate terminal 424 is 2.0 volts (e.g., the voltage drop from the second gate terminal 424 to the second source terminal 422 is 2.0 volts), then the voltage at the second source terminal 422 is the voltage at the second drain terminal 420 (e.g., 1.0 volts) less the voltage drop across the second switch 406. In such examples disclosed herein, the voltage at the second source terminal 422 is the voltage at the second drain terminal 420 less the voltage drop across the second switch 406 if the second switch 406 operates in the ohmic region of operation. In examples disclosed herein, the voltage drop across the second switch 406 may be negligible and thus, the voltage at the second source terminal 422 is substantially similar to (e.g., within a 5% tolerance) the voltage at the second drain terminal 420.

Alternatively, if the voltage drop from the second drain terminal 420 to the second source terminal 422 is greater than or equal to the voltage drop from the second gate terminal 424 to the second source terminal 422, minus a switch threshold voltage (e.g., 0.7 volts), then the second switch 406 operates in saturation (e.g., operates in the active region of operation). When the second switch 406 operates in the saturation (e.g., operates in the active region of operation), the second switch 406 acts as a current source and, as such, the voltage at the second source terminal 422 is clamped (e.g., limited) to the voltage at the second gate terminal 424. For example, if the voltage at the second drain terminal 420 is 2.4 volts and the voltage at the second gate terminal 424 is 1.3 volts, then the voltage at the second source terminal 422 is clamped (e.g., limited) to the voltage at the second gate terminal 424 (e.g., 1.3 volts). In such examples disclosed herein, the voltage at the second source terminal 422 is clamped (e.g., limited) to the voltage at the second gate terminal 424 if the second switch 406 operates in saturation (e.g., operates in the active region of operation).

In the example illustrated in FIG. 4, the first current source 408 is coupled to the example power rail 421 and the first drain terminal 414 of the first switch 402. The first current source 408 provides a current to the first drain terminal 414 in order to ensure the first switch 402 operates in saturation. For example, the first current source 408 may provide a current of 1 microampere to the first drain terminal 414, therefore ensuring the first switch 402 operates in saturation. In other examples disclosed herein, the first current source 408 may provide any suitable current value (e.g., 2 microamperes, etc.) to the first drain terminal 414.

In the example illustrated in FIG. 4, the second current source 410 is coupled to the reference rail 412 and the second source terminal 422 of the second switch 406. The second current source 410 provides a constant current to conduct through the second source terminal 422. For example, the second current source 410 may provide a current of 1 microampere to conduct through the second source terminal 422. In other examples disclosed herein, the second current source 410 may provide any suitable current value (e.g., 2 microamperes, etc.) to conduct through the second source terminal 422.

In FIG. 4, the reference rail 412 provides a voltage reference (e.g., 0 volts, ground, common), for the first example clamping circuit 304a. The reference rail 412 may be implemented as a digital ground, earth ground, reference voltage source, and/or any suitable method of implementing a reference rail.

In FIG. 4, an example diode 419 is connected to the second drain terminal 420 and the second source terminal 422. The diode 419 is a parasitic diode inherent to the second switch 406. For example, when implemented in a printed circuit board (PCB) or any other suitable hardware application, the diode 419 may not be implemented as a separate discrete device and may be a parasitic diode inherent to the second switch 406.

Figure 5:
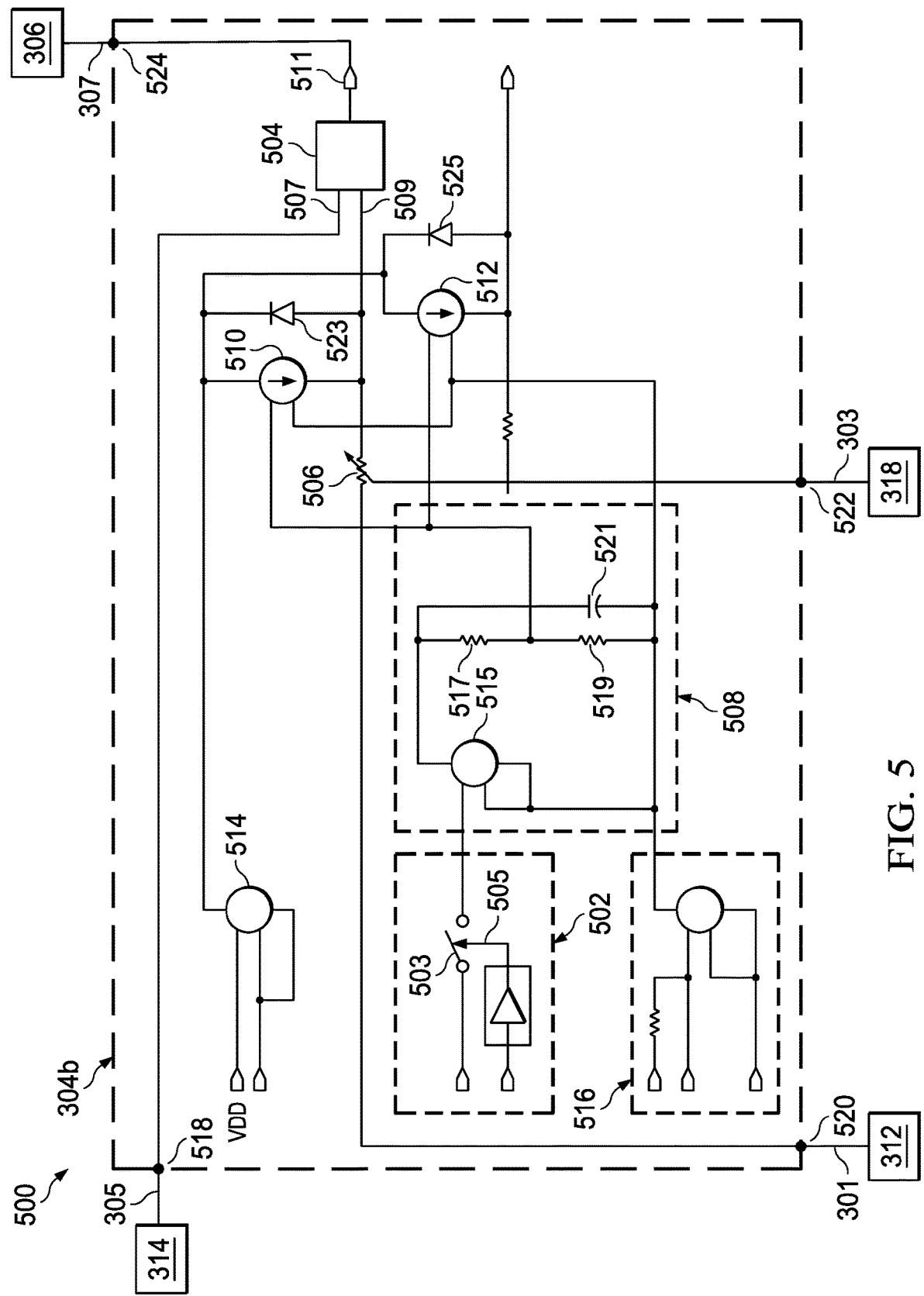
FIG. 5 is a schematic illustration of a second example implementation of the clamping circuit of FIG. 3 to control a gain limit of the DPWM signal generator of FIG. 3.

FIG. 5 is a schematic illustration 500 of a second example implementation 304b of the clamping circuit 304 of FIG. 3 to control a gain limit of the modulator 306 of FIG. 3. For example, the second implementation 304b is a second example clamping circuit 304b. The second example clamping circuit 304b includes an example initiator 502, an example comparator 504, an example adjuster 506, an example current control circuit 508, an example first current source 510, an example second current source 512, an example first isolator 514, and an example second isolator 516.

In the example illustrated in FIG. 5, the initiator 502 is coupled to the current control circuit 508. The initiator includes an example switch 503 controllable by an example enable signal (line 505). In examples disclosed herein, the enable signal (line 505) is generated by the controller 302 of FIG. 3. Alternatively, the enable signal (line 505) may be generated by any other internal and/or external controller (e.g., a microcontroller), hardware selectors, etc. The initiator 502 controls the operation of the second example clamping circuit 304b. For example, if the enable signal (line 505) is a logic high, then the second example clamping circuit 304b operates. In a similar example, if the enable signal (line 505) is a logic low, then the second example clamping circuit 304b may not operate. In other examples disclosed herein, the switch 503 may be any suitable switching device (e.g., a PMOS, a NMOS, a BJT, etc.).

In the example illustrated in FIG. 5, the comparator 504 includes an example first input terminal 507, an example second input terminal 509, and an example output terminal 511. The first input terminal 507 is coupled to an example first input connector 518. The second input terminal 509 is coupled to the adjuster 506. Additionally, the second input terminal 509 is indirectly coupled to an example second input connector 520 and an example third input connector 522 via the adjuster 506. The output terminal 511 is coupled to an example fourth input connector 524.

In FIG. 5, the comparator 504 compares the voltage at the first input terminal 507 with the voltage at the second input terminal 509. In response, the comparator 504 determines the lesser of the voltage at the first input terminal 507 or the voltage at the second input terminal 509 (e.g., the voltage level with the least magnitude) and generates an output voltage signal (e.g., the clamped control signal (line 307) of FIG. 3) equivalent to the determined lesser voltage (e.g., the smaller voltage level). For example, if the first input terminal 507 has voltage of 1.0 volts and the second input terminal 509 has a voltage of 1.2 volts, the voltage at the output terminal 511 is 1.0 volts. In examples disclosed herein, the comparator 504 may perform a similar operation as the first switch 402 and the second switch 406 of FIG. 4. The comparator 504 is implemented as a multiplexor. Alternatively, in other examples disclosed herein, the comparator 504 may be implemented by any suitable hardware component and/or network of hardware components (e.g., a multiplexor, a comparator network, etc.).

In the example illustrated in FIG. 5, the adjuster 506 is coupled to the second input connector 520, the third input connector 522, and the second input terminal 509 of the comparator 504. In FIG. 5, the adjuster 506 is a three-terminal resistor with a sliding and/or rotating contact controllable by the second reference voltage signal (line 303) at the third input connector 522. For example, the adjuster 506 may be a potentiometer. In operation, the adjuster 506 is adjusted (e.g., the resistance is altered) in order to ensure the voltage at the second input terminal 509 is the effective summed voltage of the first reference voltage signal (line 301) and the second reference voltage signal (line 303). In other examples disclosed herein, the adjuster 506 may perform the operation of the buffer 404 of FIG. 4. The operation of the adjuster 506 will be explained in connection with the first current source 510 and the second current source 512, below.

In the illustrated example of FIG. 5, the current control circuit 508 is coupled to the initiator 502, the second isolator 516, and first current source 510 and the second current source 512. The current control circuit 508 of FIG. 5 includes an example voltage source 515, an example first resistor 517, an example second resistor 519, and an example capacitor 521 to regulate the current supplied to and/or provided from the first current source 510 and the second current source 512. For example, the current control circuit 508 ensures 2 microamperes of current conducts through the first resistor 517 and the second resistor 519. In such an example, 2 microamperes of current conducts through the first current source 510 and the second current source 512. In other examples disclosed herein, the current control circuit 508 may generate and/or otherwise operate to provide any suitable numerical amount of current (e.g., 0.5 microamperes, 1 milliampere, etc.) via the first resistor 517 and the second resistor 519 to the first current source 510 and the second current source 512.

In FIG. 5, the first current source 510 is coupled in parallel with an example first diode 523. In examples disclosed herein, the first current source 510 is coupled to the current control circuit 508 to provide a constant current to the adjuster 506. In the example topology of FIG. 5, the first current source 510 is implemented as an independent current source. In other examples disclosed herein, the first current source 510 may be implemented as a plurality of current mirrors, an amplifier current source, or any suitable implementation of a current source. In examples disclosed herein, the first current source 510 provides a current to conduct through the adjuster 506 such that the voltage drop across the adjuster 506 can be adjusted based on the resistance of the variable resistor. The first diode 523 is a protection device configured to ensure the voltage at the second input terminal 509 does not increase to unsafe levels (e.g., 1 kilovolt). In some examples disclosed herein, the first diode 523 is a parasitic diode inherent to the first current source 510. For example, when implemented in a printed circuit board (PCB) or any other suitable hardware application, the first diode 523 may or may not be implemented as a separate discrete device.

In FIG. 5, the second current source 512 is coupled in parallel with an example second diode 525. In examples disclosed herein, the second current source 512 is coupled to the current control circuit 508 to provide a constant current to the adjuster 506. In the example topology of FIG. 5, the second current source 512 is implemented as an independent current source. In other examples disclosed herein, the second current source 512 may be implemented as a plurality of current mirrors, an amplifier current source, or any suitable implementation of a current source. The second diode 525 is a protection device configured to ensure the voltage at the second input terminal 509 does not increase to unsafe levels (e.g., 1 kilovolt). In some examples disclosed herein, the second diode 525 is a parasitic diode inherent to the second current source 512. For example, when implemented in a printed circuit board (PCB) or any other suitable hardware application, the second diode 525 may or may not be implemented as a separate discrete device.

In the example illustrated in FIG. 5, the first isolator 514 isolates the second example clamping circuit 304b from external circuits. In the example illustrated in FIG. 5, the first isolator 514 may perform the function of the power rail 421 of FIG. 4 to provide power to the first current source 510 and to the second current source 512.

In the example illustrated in FIG. 5, the second isolator 516 isolates the second example clamping circuit 304b from external circuits. In the example illustrated in FIG. 5, the second isolator 516 may perform the function of the reference rail 412 of FIG. 4 to provide a reference voltage to the first current source 510, to the second current source 512, and to the current control circuit 508.

Figure 6A:
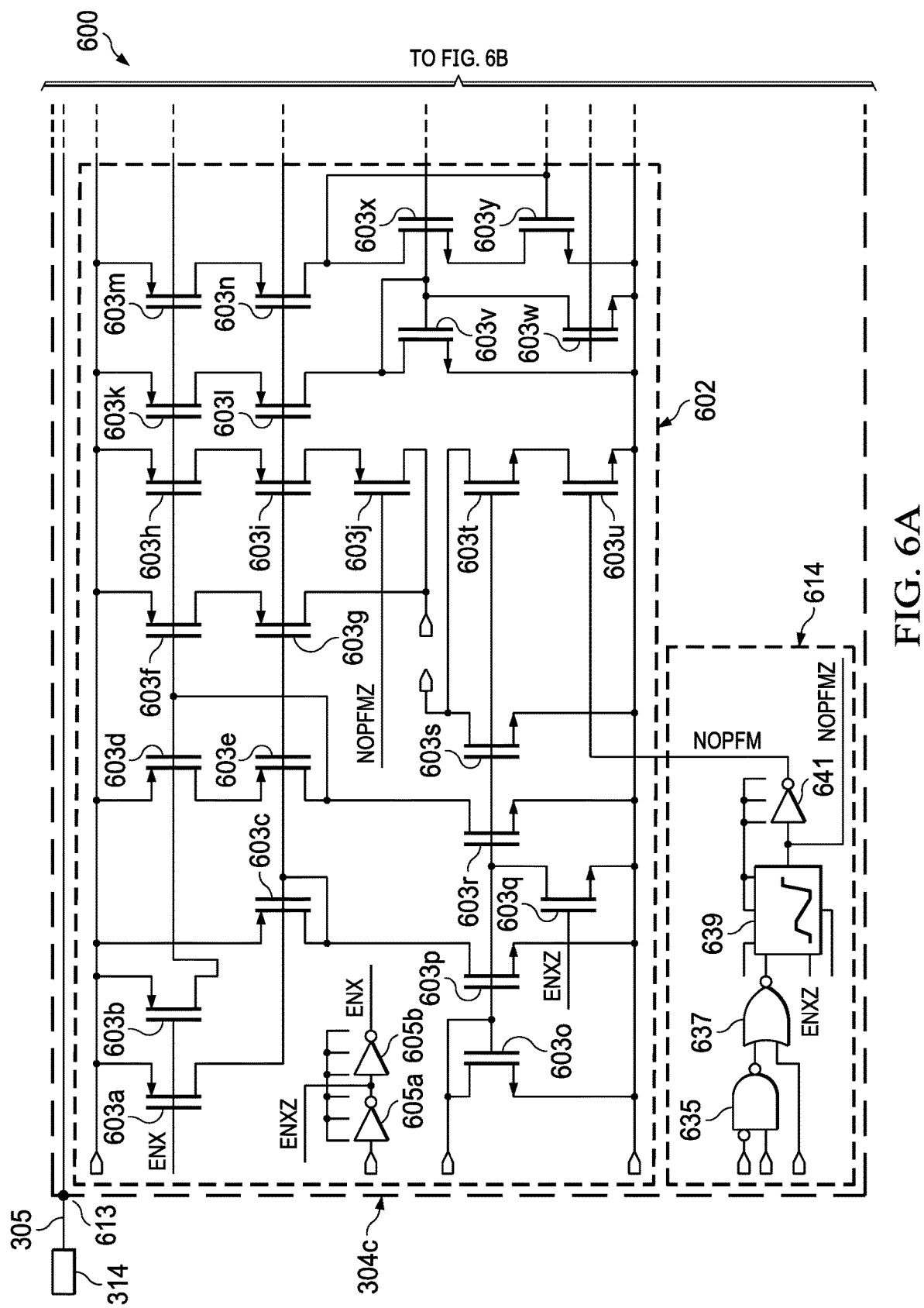
FIGS. 6A-6C are schematic illustrations of a third example implementation of the clamping circuit of FIG. 3 to control a gain limit of the DPWM signal generator of FIG. 3.
Figure 6B:
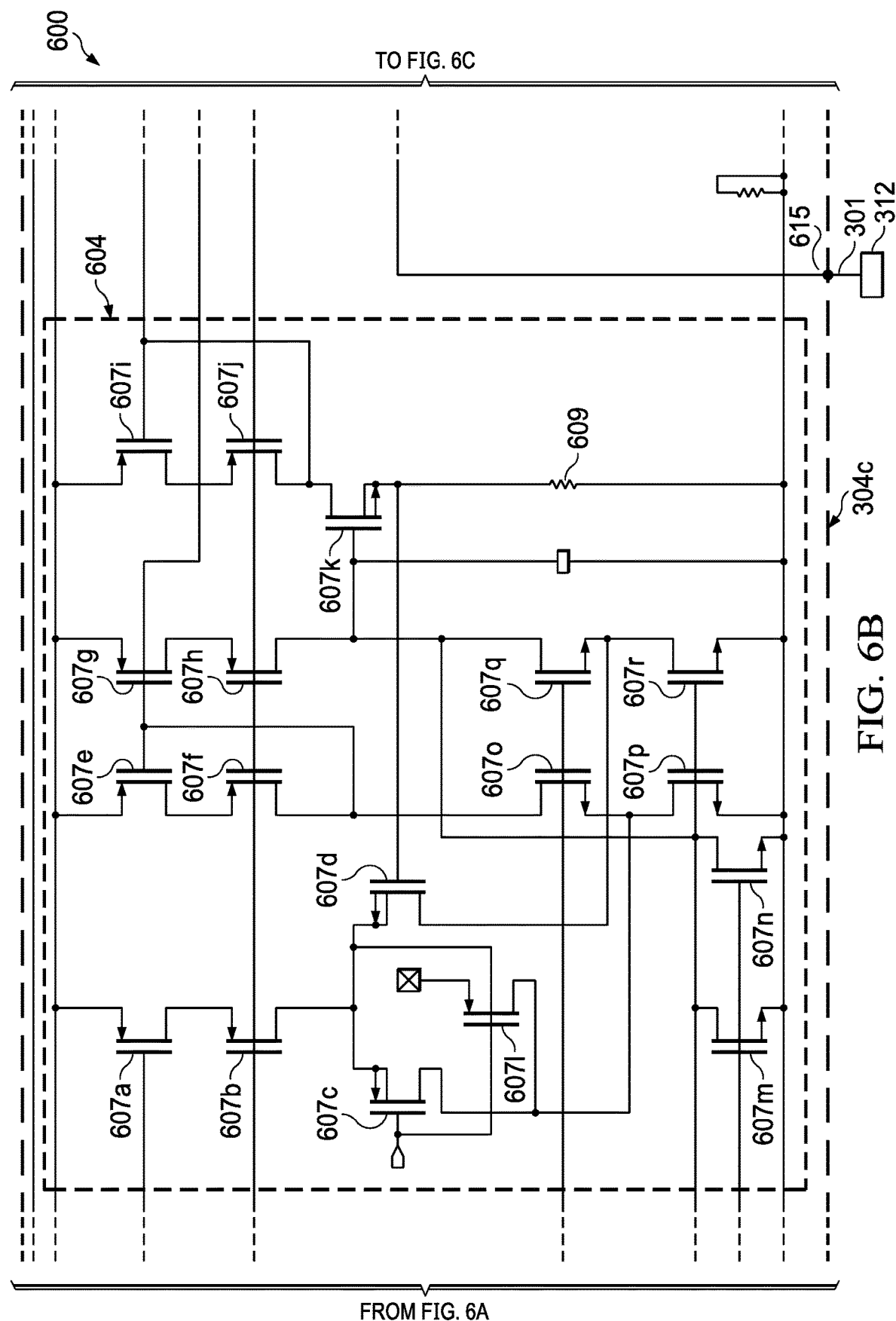
Figure 6C:
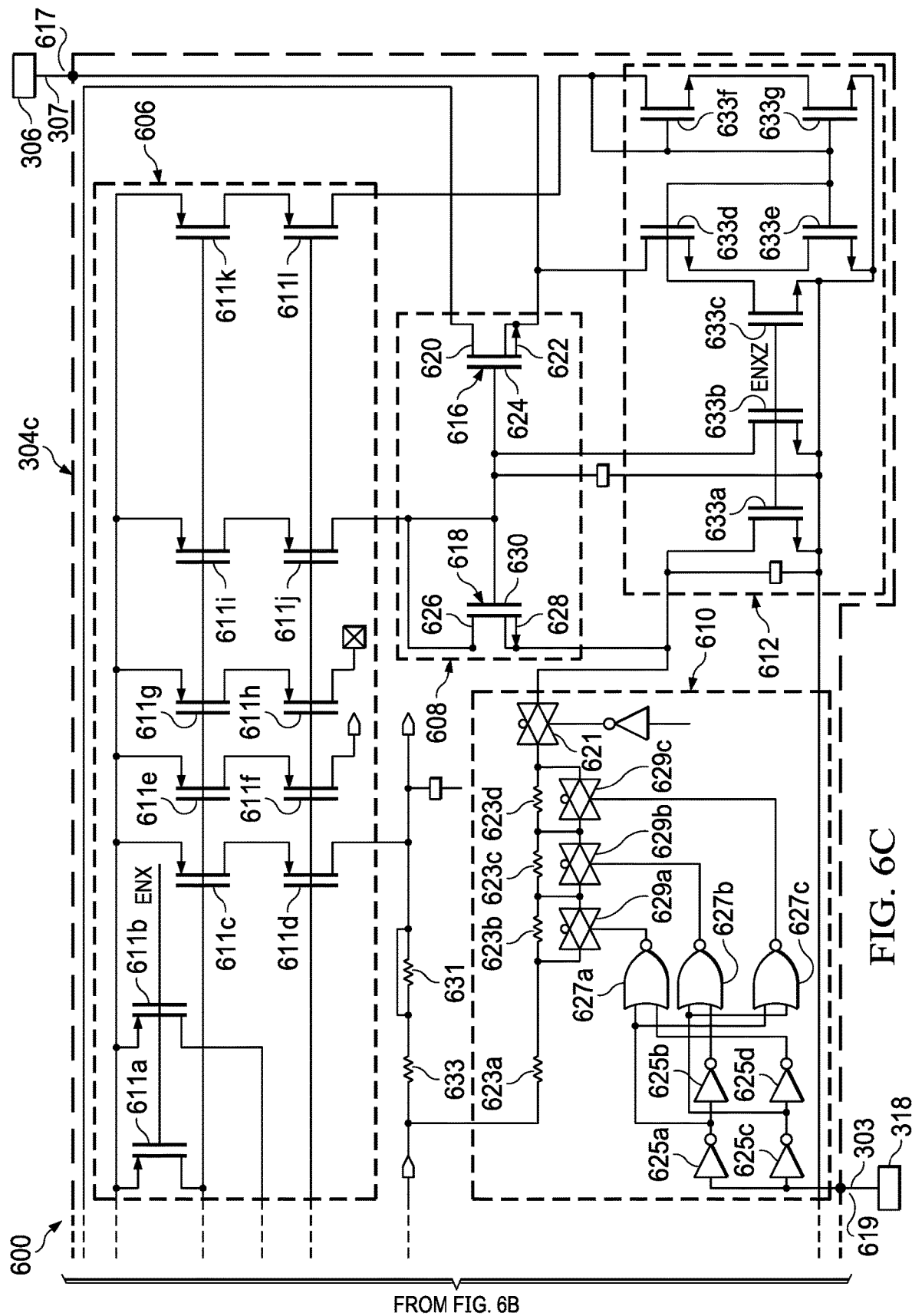

FIGS. 6A-6C are schematic illustrations 600 of a third example implementation 304c of the clamping circuit 304 of FIG. 3 to control a gain limit of the modulator 306 of FIG. 3. For example, the third implementation 304c is a third example clamping circuit 304c. The third example clamping circuit 304c includes a first example current source circuit 602, an example amplifier 604, an example current mirror circuit 606, an example clamping buffer 608, an example adjuster 610, a second example current source circuit 612, an example enabler circuit 614.

In the example illustrated in FIGS. 6A-6B, the first current source circuit 602 is coupled to the amplifier 604 and the enabler circuit 614. The first current source circuit 602 includes a plurality of example transistors 603a-603y and a plurality of example logic gates 605a, 605b. The first current source circuit 602 utilizes the plurality of the transistors 603a-603y to generate and/or otherwise provide a current source bias for the amplifier 604. In other examples disclosed herein, one or more of the elements illustrated in the first current source circuit 602 (e.g., the transistors 603a-603y) may be combined, omitted, and/or rearranged to implement the first current source circuit 602 to provide a current bias to the amplifier 604. In other examples disclosed herein, the first current source circuit 602 may be implemented as a single current mirror circuit, a current source amplifier, or any suitable implementation of providing a current source bias.

In the example illustrated in FIGS. 6A-6C, the amplifier 604 is coupled to the first current source circuit 602 and the current mirror circuit 606 to generate and/or otherwise provide a current to conduct through the current mirror circuit 606. In the example of FIG. 6C, the current provided to conduct through the current mirror circuit 606 is a constant current. Alternatively, the current provided to conduct through the current mirror circuit 606 may be a variable current and/or an adjustable current. The amplifier includes a plurality of example transistors 607a-607r and an example amplifying resistor 609. In other examples disclosed herein, one or more of the elements illustrated in the amplifier 604 (e.g., the transistors 607a-607r) may be combined, omitted, and/or rearranged to implement the amplifier 604 to provide a current to conduct through the current mirror circuit 606. In the example of FIG. 6B, the amplifier 604 ensures the voltage drop across the amplifying resistor 609 is a desired voltage (e.g., a constant voltage level). As such, the current conducting through the amplifying resistor 609 provided to the current mirror circuit 606 is a desired constant current. In examples disclosed herein, the current provided to the current mirror circuit 606 is 2 microamperes. In other examples disclosed herein, the current provided to the current mirror circuit 606 may be any other numerical current value (e.g., 1 microampere, 1 milliampere).

In FIGS. 6A-6C, the current mirror circuit 606 is coupled to the amplifier 604 and to the clamping buffer 608. The current mirror circuit 606 includes a plurality of transistors 611a-611l. In other examples disclosed herein, one or more of the elements illustrated in current mirror circuit 606 (e.g., the transistors 611a-611l) may be combined, omitted, and/or rearranged to implement the current mirror circuit 606 to provide a current to conduct through the clamping buffer 608. In operation, the current mirror circuit 606 replicates the current provided by the amplifier 604 and conducts such current to the clamping buffer 608. In other examples disclosed herein, the first current mirror circuit 606 may be implemented as a single current mirror circuit, a current source amplifier, or any suitable implementation of providing a current source bias. In other examples disclosed herein, the operation of the first current source circuit 602, the amplifier 604, and the current mirror circuit 606 may perform the function of the power rail 421 and the first current source 408 of FIG. 4, and/or the first isolator 514 and the first current source 510 of FIG. 5.

In FIGS. 6A-6C, the clamping buffer 608 is coupled to an example first input connector 613, an example second input connector 615, an example third input connector 617, the adjuster 610, and the second current source circuit 612. In the example illustrated in FIG. 6C, the clamping buffer 608 includes an example series transistor 616 and an example diode connected switch 618 to clamp (e.g., limit) the clamped control signal (line 307) of FIG. 3. For example, the clamped control signal (line 307) is clamped (e.g., limited) to the lesser (e.g., lower magnitude) of the control signal (line 305) of FIG. 3 or the sum of the first reference voltage signal (line 301) and the second reference voltage signal (line 303) of FIG. 3. The series switch 616 includes a first drain terminal 620, a first source terminal 622, and a first gate terminal 624. The diode connected switch 618 includes a second drain terminal 626, a second source terminal 628, and a second gate terminal 630. The first gate terminal 624 of the series switch 616 and the second gate terminal 630 of the diode connected switch 618 are coupled together. Illustrated in FIGS. 6A-6C, the first drain terminal 620 is coupled to the first input connector 613. The first source terminal 622 is coupled to the third input connector 617. Additionally, the second drain terminal 626 is coupled to the current mirror circuit 606 and to the second gate terminal 630. The second source terminal 628 is coupled to the adjuster 610 and to the second current source circuit 612. In other examples disclosed herein, the clamping buffer 608 may be implemented as a common gate amplifier.

In the example topology of FIGS. 6A-6C, the control signal (line 305) (e.g., input signal) and the clamped control signal (line 307) (e.g., output signal) are coupled together through the series switch 616. The first gate terminal 624 of the series switch 616 may be biased at the second source terminal 628 of the diode connected switch 618. The second source terminal 628 of the diode connected switch 618 is coupled to the adjuster 610 via an example transfer gate 621.

In the example illustrated in FIG. 6C, the adjuster 610 includes a plurality of selectable resistors 623a-623d. In operation, the second reference voltage signal (line 303) from an example fourth input connector 619 provides control to example first logic gates 625a-625d. The first logic gates 625a-625d provide example second logic gates 627a-627c control signals (e.g., enable signals) to operate example transfer gates 629a-629c. For example, the second reference voltage signal (line 303) indicates the number of selectable resistors 623a-623d to conduct current via control enable signals from the first logic gates 625a-625d and the second logic gates 627a-627d.

In the example illustrated in FIG. 6C, the current provided by the current mirror circuit 606 (e.g., 2 microamperes) conducts through the second drain terminal 626, an example first resistor 631, and an example second resistor 633. The second resistor 633 is coupled to the second input connector 615. In operation, the current provided by the current mirror circuit 606 (e.g., 2 microamperes) conducts through the first resistor 631 and the second resistor 633 and, coupled with the second input connector 615, generates and/or otherwise creates a voltage drop across the selectable resistors 623a-623d equivalent to, or proportional to, the sum of the voltage of the first reference voltage signal (line 301) and the second reference voltage signal (line 303). For example, the number of selected (e.g., enabled via the transfer gates 629a-629c) resistors of the selectable resistors 623a-623d are configured to provide an adjustable resistance to generate a voltage at the second source terminal 628 of the diode connected switch 618 equivalent to, or proportional to, the voltage of the first reference voltage signal (line 301) summed with the voltage of the second reference voltage signal (line 303).

In such an arrangement (e.g., connected as a diode connected device), the diode connected switch 618 operates in saturation (e.g., a change in current conducting through the second drain terminal 626 to the second source terminal 628 is independent from a change in the voltage drop across the second drain terminal 626 and the second source terminal 628). In operation, the voltage at the second source terminal 628 is fixed due to the supply from the selectable resistors 623*a-d*. As such, the voltage at the second source terminal 628 is equivalent to the sum of the voltage at the second input connector 615 and the voltage at the fourth input connector 619. When the diode connected switch 618 conducts, the voltage at the second drain terminal 626 follows a voltage equivalent to the voltage at the second source terminal 628 summed with the switch threshold voltage (e.g., a voltage drop of 0.1 volts due to the resistance of the diode connected switch 618). For example, if the switch threshold voltage is 0.1 volts (e.g., a voltage drop of 0.1 volts across the diode connected switch 618 due to the resistance of the diode connected switch 618), the voltage at the second drain terminal 626 is equivalent to the voltage at the second source terminal 628 (e.g., the sum of the voltage at the second input connector 615 and the voltage at the fourth input connector 619) plus the 0.1 volt drop across the diode connected switch 618. Because the second drain terminal 626 of the diode connected switch 618 is coupled to the second gate terminal 630 of the diode connected switch 618, the voltage at the second gate terminal 630 will be equivalent to the voltage at the second source terminal 628 summed with the voltage drop across the diode connected switch 618 (e.g., 0.1 volts).

In FIG. 6C, the first gate terminal 624 is coupled to the second gate terminal 630 of the diode connected switch 618. In such an arrangement, the voltage at the second gate terminal 630 (e.g., the voltage at the second drain terminal 626) is equivalent to the voltage at the first gate terminal 624 of the series switch 616.

In FIG. 6C, if the voltage drop from the first drain terminal 620 (e.g., the voltage of the control signal (line 305)) to the first source terminal 622 is less than the voltage drop from the first gate terminal 624 to the first source terminal 622, minus a switch threshold voltage (e.g., 0.7 volts), the series switch 616 is in the ohmic region of operation. When the series switch 616 is in the ohmic region of operation, the voltage at first drain terminal 620 (e.g., the voltage of the control signal (line 305)) linearly drops across the series switch 616 to the first source terminal 622 due to the resistance of the series switch 616. For example, if the voltage of the control signal (line 305) is 1.2 volts (e.g., the voltage drop from the first drain terminal 620 to the first source terminal 622 is 1.2 volts), and the voltage of first gate terminal 624 is 2.0 volts (e.g., the voltage drop from the first gate terminal 624 to the first source terminal 622 is 2.0 volts), then the voltage at the first source terminal 622 will be the voltage at the first drain terminal 620 (e.g., 1.0 volts) less the voltage drop across the series switch 616. In examples disclosed herein, the voltage drop across the series switch 616 may be negligible and thus, the voltage at the first source terminal 622 is substantially similar to (e.g., within a 5% tolerance) the voltage at the first drain terminal 620.

Alternatively, if the voltage drop from the first drain terminal 620 to the first source terminal 622 is greater than or equal to the voltage drop from the first gate terminal 624 to the first source terminal 622, minus a switch threshold voltage (e.g., 0.7 volts), then the series switch 616 operates in saturation (e.g., operates in the active region of operation). When the series switch 616 operates in the active region of operation, the series switch 616 acts as a current source and, as such, the voltage at the first source terminal 622 is clamped (e.g., limited) to the voltage at the first gate terminal 624. For example, if the voltage of the control signal (line 305) is 2.4 volts, and the voltage at the first gate terminal 624 is 1.3 volts, then the voltage at the first source terminal 622 is clamped (e.g., limited) to the voltage at the first gate terminal 624 (e.g., 1.3 volts).

In the example illustrated in FIG. 6C, the second current source circuit 612 is coupled to the clamping buffer 608 and the adjuster 610. The second current source circuit 612 includes a plurality of example transistors 633*a*-633*g*. In other examples disclosed herein, one or more of the elements illustrated in the second current source circuit 612 (e.g., the transistors 633*a*-633*g*) may be combined, omitted, or rearranged to implement the second current source circuit 612 to provide a current bias to the clamping buffer 608. The second current source circuit 612 utilizes a plurality of the transistors 633*a*-633*g* to generate and/or otherwise provide a current source bias for the clamping buffer 608. In other examples disclosed herein, the second current source circuit 612 may be implemented as a single current mirror circuit, a current source amplifier, or any suitable implementation of providing a current source bias.

In the example illustrated in FIG. 6A, the enabler circuit 614 is coupled to the first current source circuit 602. The enabler circuit 614 includes an example first logic gate 635, an example second logic gate 637, an example level shifter 639, and an example third logic gate 641 (e.g., a NOT gate). In FIG. 6A, the first logic gate 635 is an example NOT-AND (NAND) gate, the second logic gate 637 is an example NOT-OR (NOR) gate, and the third logic gate 641 is an example inverter gate. In other examples disclosed herein, the first logic gate 635, the second logic gate 637, and the third logic gate 641 may be any suitable logic gate and/or device. The enabler circuit 614 provides an enable signal to the first current source circuit 602 to operate the third example clamping circuit 304*c*. For example, the enabler circuit 614 may provide a signal indicating to not operate (e.g., turn-off) the third example clamping circuit 304*c*. In other examples disclosed herein, the enabler circuit 614 may be implemented by any suitable enabling device (e.g., a switch, a transistor, a comparator, etc.).

FIG. 7 is a signal plot 700 depicting a clamped control signal versus time and a converter output voltage signal of the circuit of FIG. 3. Illustrated in an example first depiction 702 of the signal plot 700, the voltage of the first reference voltage signal (line 301) from the reference voltage generator 312 of FIG. 3 is one volt. As such, in an example first clamped control signal (line 704), the voltage level of the second reference voltage signal (line 303) is 100 millivolts. In such examples disclosed herein, the first clamped control signal (line 704) is clamped to 1.1 volts and the first clamped control signal (line 704) is overdamped. Illustrated in the first depiction 702, an example second clamped control signal (line 706) illustrates when the voltage level of the second reference voltage signal (line 303) is 200 millivolts. In such examples disclosed herein, the second clamped control signal (line 706) is clamped to 1.2 volts and the second clamped control signal (line 706) is critically damped. Illustrated in the first depiction 702, an example third clamped control signal (line 708) illustrates when the voltage level of the second reference voltage signal (line 303) is 300 millivolts. In such examples disclosed herein, the third clamped control signal (line 708) is clamped to 1.3 volts and the third clamped control signal (line 708) is underdamped.

Illustrated in an example second depiction 710 of the signal plot 700, the voltage level of the output voltage signal (line 315) from the power stage 316 of FIG. 3 is one volt. As such, in an example first output voltage signal (line 712), the voltage level of the second reference voltage signal (line 303) is 100 millivolts. In such examples disclosed herein, the first output voltage signal (line 712) is overdamped. Illustrated in the second depiction 710, an example second output voltage signal (line 714) illustrates when the voltage level of the second reference voltage signal (line 303) is 200 millivolts. In such examples disclosed herein, the second output voltage signal (line 714) is critically damped. Illustrated in the second depiction 710, an example third output voltage signal (line 716) illustrates when the voltage of the second reference voltage signal (line 303) is 300 millivolts. In such examples disclosed herein, the third output voltage signal (line 716) is underdamped.

FIG. 8 is a signal plot 800 depicting various signals of FIGS. 3, 4, 5, 6A, 6B, and 6C. The signal plot 800 of FIG. 8 includes a first example reference voltage signal (line 802), a second example reference voltage signal (line 804), an example summed voltage signal (line 806), an example control signal (line 808), and an example clamped control signal (line 810). In FIG. 8, the first reference voltage signal (line 802) may represent the first reference voltage signal (line 301) of FIG. 3 and the second reference voltage signal (line 804) may represent the second reference voltage signal (line 305) of FIG. 3. Moreover, the summed voltage signal (line 806) may represent any of the voltage at the first source terminal 416 of FIG. 4, the voltage at the second input terminal 509 of the comparator 504 of FIG. 5, or the voltage at the second source terminal 628 of FIGS. 6A-6C. Additionally, the control signal (line 808) may represent the control signal (line 305) of FIG. 3 and the clamped control signal (line 810) may represent the clamped control signal (line 307) of FIG. 3. In the signal plot 800 of FIG. 8, the magnitude of the voltage of any of the signals may be any suitable value.

At an example first time interval 812, the first reference voltage signal (line 802) is two volts, the second reference voltage signal (line 804) is zero volts, the summed voltage signal (line 806) is two volts, and the control signal (line 808) is one volt. Therefore, because the control signal (line 808) is less than the summed voltage signal (line 806), the clamped control signal (line 810) remains equivalent to the control signal (line 808) and thus, is one volt.

At an example second time interval 814, the first reference voltage signal (line 802) is two volts, the second reference voltage signal (line 804) is one volt, the summed voltage signal (line 806) is three volts, and the control signal (line 808) is one volt. Therefore, because the control signal (line 808) is less than the summed voltage signal (line 806), the clamped control signal (line 810) remains equivalent to the control signal (line 808) and thus, is one volt.

At an example third time interval 816, the first reference voltage signal (line 802) is two volts, the second reference voltage signal (line 804) is one volt, the summed voltage signal (line 806) is three volts, and the control signal (line 808) is four volts. Therefore, because the control signal (line 808) is greater than the summed voltage signal (line 806), the clamped control signal (line 810) is clamped to the summed voltage signal (line 806) and thus, is three volts.

While an example manner of implementing the clamping circuit 304 is illustrated in FIGS. 4, 5, and 6, one or more of the elements, processes and/or devices illustrated in FIGS. 4, 5, and 6 may be combined, divided, rearranged, omitted, eliminated and/or implemented in any other way. Further, the example clamping circuit 304, the example modulator 306, the example oscillator 308, the example feed forward voltage regulator 310, the example reference voltage generator 312, the example error amplifying circuit 314, the example power stage 316, the example selector 318, and/or, more generally, the example power converter system 300, the example buffer 402, the example first switch 404, the example variable resistor 405, the example second switch 406, the example first current source 408, the example second current source 410, and/or, more generally, the example first implementation 304a of the clamping circuit 304, the example initiator 502, the example comparator 504, the example adjuster 506, the example current controlled circuit 508, the example first current source 510, the example second current source 512, the example first isolator 514, the example second isolator 516, and/or more generally, the example second implementation 304b of the clamping circuit 304, the example current source circuit 602, the example amplifier 604, the example current mirror circuit 606, the example clamping buffer 608, the example adjustor 610, the example second current source circuit 612, the example enabler circuit, and/or, more generally, the example third implementation 304c of the clamping circuit 304 may be implemented by hardware, software, firmware and/or any combination of hardware, software and/or firmware. Thus, for example, any of the example clamping circuit 304, the example modulator 306, the example oscillator 308, the example feed forward voltage regulator 310, the example reference voltage generator 312, the example error amplifying circuit 314, the example power stage 316, the example selector 318, and/or, more generally, the example power converter system 300, the example buffer 402, the example first switch 404, the example variable resistor 405, the example second switch 406, the example first current source 408, the example second current source 410, and/or, more generally, the example first implementation 304a of the clamping circuit 304, the example initiator 502, the example comparator 504, the example adjuster 506, the example current controlled circuit 508, the example first current source 510, the example second current source 512, the example first isolator 514, the example second isolator 516, and/or more generally, the example second implementation 304b of the clamping circuit 304, the example current source circuit 602, the example amplifier 604, the example current mirror circuit 606, the example clamping buffer 608, the example adjustor 610, the example second current source circuit 612, the example enabler circuit, and/or, more generally, the example third implementation 304c of the clamping circuit 304 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one the example clamping circuit 304, the example modulator 306, the example oscillator 308, the example feed forward voltage regulator 310, the example reference voltage generator 312, the example error amplifying circuit 314, the example power stage 316, the example selector 318, and/or, more generally, the example power converter system 300, the example buffer 402, the example first switch 404, the example variable resistor 405, the example second switch 406, the example first current source 408, the example second current source 410, and/or, more generally, the example first implementation 304a of the clamping circuit 304, the example initiator 502, the example comparator 504, the example adjuster 506, the example current controlled circuit 508, the example first current source 510, the example second current source 512, the example first isolator 514, the example second isolator 516, and/or more generally, the example second implementation 304b of the clamping circuit 304, the example current source circuit 602, the example amplifier 604, the example current mirror circuit 606, the example clamping buffer 608, the example adjustor 610, the example second current source circuit 612, the example enabler circuit, and/or, more generally, the example third implementation 304c of the clamping circuit 304 is/are hereby expressly defined to include a non-transitory computer readable storage device or storage disk such as non-volatile memory (e.g., read-only memory (ROM), electrically erasable programmable read-only memory (EEPROM), flash memory, etc.), volatile memory (e.g., Synchronous Dynamic Random Access Memory (SDRAM), Dynamic Random Access Memory (DRAM), etc., and/or any other type of random access memory (RAM) device), etc., including the software and/or firmware. Further still, the example power converter system 300 of FIG. 3 may include one or more elements, processes and/or devices in addition to, or instead of, those illustrated in FIG. 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
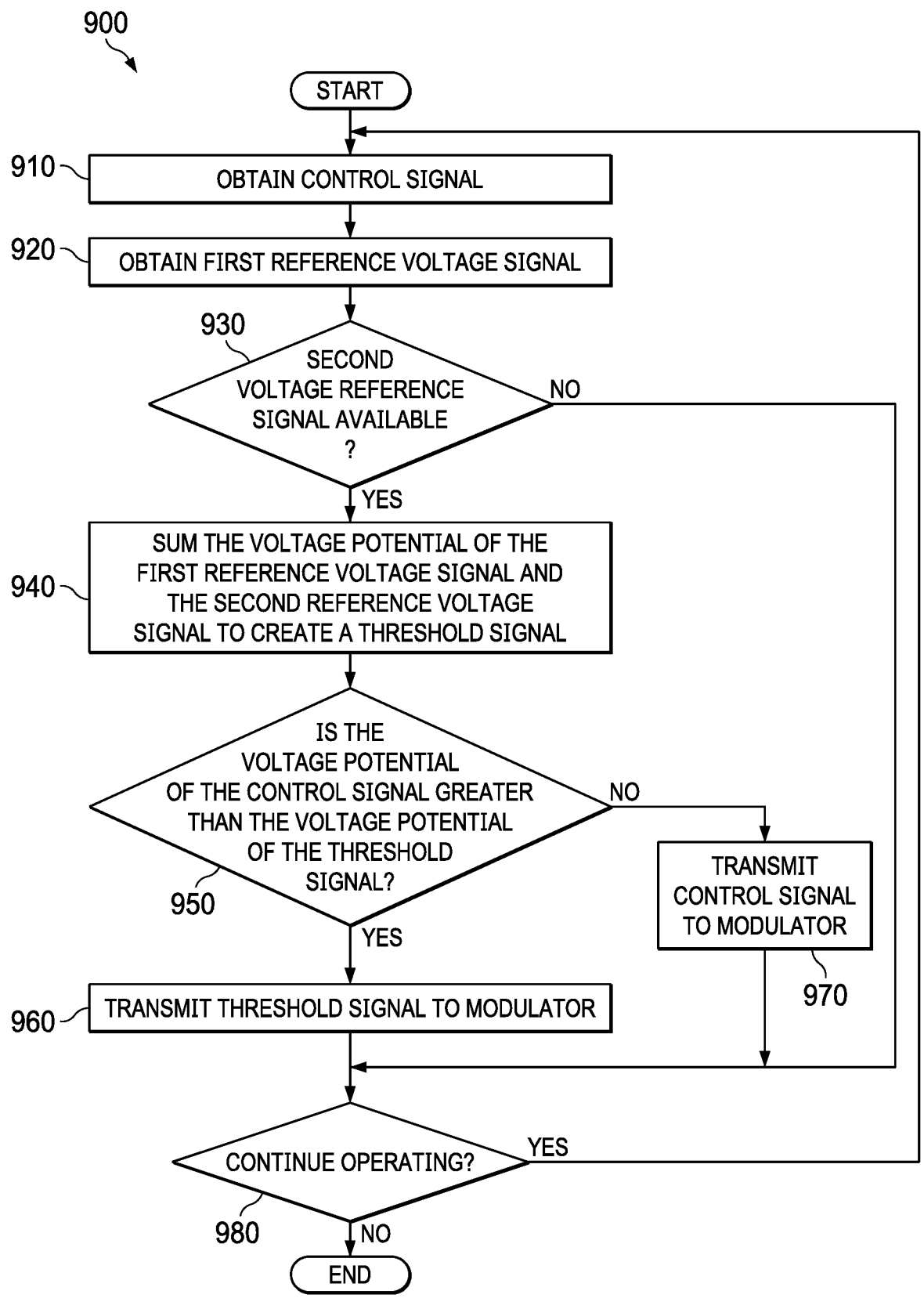
FIG. 9 is a flowchart representative of example machine readable instructions that may be executed to implement the clamping circuit of FIG. 3 to clamp a voltage level of the control signal to adjust a transient response of the controller.

A flowchart representative of example hardware logic, machine readable instructions, hardware implemented state machines, and/or any combination thereof for implementing the clamping circuit 304 of FIG. 3 is shown in FIG. 9. The machine readable instructions may be an executable program or portion of an executable program for execution by one or more computer processors, one or more microcontrollers, etc. For example, the machine readable instructions may be executed by one or more integrated circuits, logic circuits, microprocessors, GPUs, DSPs, or controllers from any desired family or manufacturer. For example, the one or more integrated circuits, logic circuits, microprocessors, GPUs, DSPs, or controllers may be semiconductor based (e.g., silicon based) device(s). The program may be embodied in software stored on a non-transitory computer readable storage medium such as non-volatile memory, volatile memory, etc., associated with the one or more computer processors, the one or more microcontrollers, etc., but the entire program and/or parts thereof could alternatively be executed by a device other than the one or more computer processors, the one or more microcontrollers, etc., and/or embodied in firmware or dedicated hardware. Further, although the example program is described with reference to the flowchart illustrated in FIG. 9, many other methods of implementing the example clamping circuit 304 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 9 is a flowchart 900 representative of example machine readable instructions that may be executed to implement the clamping circuit 304 of FIG. 3 to clamp a voltage level of the control signal (line 305) to adjust a transient response of the controller 302. Illustrated by the control in FIG. 9, the clamping circuit 304 receives the control signal (e.g., the control signal (line 305)) (block 910). For example, the clamping circuit 304 is coupled to the error amplifying network 314 to obtain (e.g., receive, obtain via coupling, etc.,) the control signal (line 305). The clamping circuit 304 receives a first reference voltage signal (e.g., the first reference voltage signal (line 301)) (block 920). In examples disclosed herein, the first reference voltage signal (line 301) is obtained from the reference voltage generator 312.

In response, the clamping circuit 304 determines if an example second reference voltage signal (e.g., the second reference voltage signal (line 303) is available (block 930). In some examples disclosed herein, an example adjuster (e.g., the variable resistor 405, the adjuster 506, 610 of FIGS. 5, and 6, respectively) and/or summation network may determine and/or otherwise obtain the second reference voltage signal (line 303). If the clamping circuit 304 determines second reference voltage signal (e.g., the second reference voltage signal (line 303)) is available, control proceeds to the function of block 940. Alternatively, if the clamping circuit 304 determines second reference voltage signal (e.g., the second reference voltage signal (line 303)) is not available, control proceeds to the function of block 980. The control of block 980 will be explained in further detail below.

In response, the clamping circuit 304 sums the voltage of the first reference voltage signal (e.g., the first reference voltage signal (line 301) and the second reference voltage signal (e.g., the second reference voltage signal (line 303)) to create a threshold signal (block 940). Additionally, the clamping circuit 304 determines if the voltage of the control signal (e.g., the control signal (line 305)) is greater than (e.g., higher voltage level) the threshold signal (block 950). In some examples disclosed herein, the second switch 406 of FIG. 4, the comparator 504 of FIG. 5, and/or the clamping buffer 608 of FIGS. 6A-6C may perform the control of block 950.

If the clamping circuit 304 determines the voltage of the control signal (e.g., the control signal (line 305)) is greater than (e.g., higher voltage level) the threshold signal, then the threshold signal is transmitted to an example modulator (e.g., the modulator 306 of FIG. 3) (block 960). If the clamping circuit 304 determines the voltage of the control signal (e.g., the control signal (line 305)) is not greater than (e.g., lower voltage level) the threshold signal, then the control signal (e.g., the control signal (line 305)) is transmitted to an example modulator (e.g., the modulator 306 of FIG. 3) (block 970).

In the example control illustrated in FIG. 9, the clamping circuit 304 determines whether to continue operating (block 980). If the clamping circuit 304 determines to continue operating, control returns to block 910. Alternatively, if the clamping circuit 304 determines to not continue operating, then control ceases to operate. In such examples, the clamping circuit 304 may determine to not continue operating in response to a shut-off signal, power loss, etc.

From the foregoing, it will be appreciated that example methods, apparatus and articles of manufacture have been disclosed that control, adjust, limit, and/or clamp a control signal and/or transient response for use by a delay pulse width modulator. The disclosed methods, apparatus and articles of manufacture improve the efficiency of using a computing device by reducing the variability of a power converter output voltage signal by clamping and/or limiting a control signal voltage during periods in which the output voltage signal varies. For example, during load transients (e.g., a connected load or disconnected load) the output voltage signal, for a period of time, varies (e.g., increases above or decreases below) from normal operating conditions. In examples disclosed herein, the control signal voltage based on the output voltage signal is clamped and/or limited to ensure stable operation during periods in which the output voltage signal varies. Additionally, examples disclosed herein provide a stable output voltage signal for a connected load to ensure proper operation of the connected load. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus adapted to be coupled to a first reference voltage output of a selector, the apparatus comprising:
   a clamping circuit including a first input, a second input, a third input, and an output, wherein the first input is adapted to be coupled to the first reference voltage output of the selector and the output is adapted to have a value of the third input clamped to be less than or equal to a clamping value;
   a reference voltage generator including a second reference voltage output, the second reference voltage output is coupled to the second input of the clamping circuit;
   an error amplifying circuit including an output connected to the third input of the clamping circuit; and
   a pulse width modulator including an input coupled to the output of the clamping circuit, the pulse width modulator operable to control a transient response of a power converter;
   wherein the clamping value is a sum of the first reference voltage output and the second reference voltage output.

2. The apparatus of claim 1, wherein the pulse width modulator further includes an output coupled to the power converter.

3. The apparatus of claim 2, wherein the power converter is a boost converter.

4. The apparatus of claim 2, wherein the power converter is a buck-boost converter.

5. The apparatus of claim 1, wherein the clamping circuit further includes a clamping buffer.

6. The apparatus of claim 1, wherein the clamping circuit further includes an adjuster.

7. The apparatus of claim 1, wherein the pulse width modulator is a delay pulse width modulator.

8. The apparatus of claim 7, wherein the delay pulse width modulator further includes a plurality of delay cells.

9. The apparatus of claim 8, wherein the plurality of delay cells are adapted to obtain a signal from the output of the clamping circuit.

10. The apparatus of claim 1, wherein the error amplifying circuit further includes an input, and wherein the input of the error amplifying circuit is adapted to be coupled to the power converter.

11. A system comprising:
a power converter having an input and an output;
an error amplifier having an input coupled to the output of the power converter, the error amplifier including an output having a first value;
a reference voltage generator having a first reference voltage output;
a selector having a second reference voltage output;
a clamping circuit having a first input coupled to the first reference voltage output, a second input coupled to the second reference voltage output, a third input connected to the output of the error amplifier and a clamped output having a value of the first value clamped to be less than or equal to a sum of the first reference voltage output and the second reference voltage output; and
a modulator coupled to the clamping circuit and operable to control a transient response of the power converter.

12. The system of claim 11, wherein the modulator includes an input coupled to the clamped output and an output coupled to the power converter.

13. The system of claim 12, wherein the modulator further includes a plurality of delay cells, wherein the plurality of delay cells are to apply a delay to an oscillating signal in response to the clamped output, wherein the plurality of delay cells are to generate a fourth signal, and wherein the fourth signal is a function of the oscillating signal and the clamped output.

14. The system of claim 11, wherein the first reference voltage output is set to a first reference voltage value and the second reference voltage output is set to a second reference voltage value.

15. The system of claim 14, wherein the clamping circuit, the error amplifier, the selector and the reference voltage generator are implemented in an integrated circuit.

16. The system of claim 15, wherein the first reference voltage value is set during manufacture of the integrated circuit.

17. The system of claim 14, wherein the second reference voltage value is set during manufacture of the system.

18. The system of claim 11, wherein the clamping circuit, the error amplifier, the selector and the reference voltage generator are implemented in an integrated circuit.

19. The system of claim 11, wherein the clamping circuit, the error amplifier, and the reference voltage generator are implemented in an integrated circuit.

20. The system of claim 11, wherein the output of error amplifier is based on the output of the power converter.

* * * * *